United States Patent
Kulkarni et al.

(10) Patent No.: US 11,361,017 B1
(45) Date of Patent: *Jun. 14, 2022

(54) METHOD TO DIFFERENTIATE AND CLASSIFY FINGERPRINTS USING FINGERPRINT NEIGHBORHOOD ANALYSIS

(71) Applicant: Roku, Inc., San Jose, CA (US)

(72) Inventors: Sunil Suresh Kulkarni, San Jose, CA (US); Pradipkumar Dineshbhai Gajjar, Sunnyvale, CA (US); Jose Pio Pereira, Cupertino, CA (US); Preshant Ramanathan, Mountain View, CA (US); Mihailo M. Stojancic, San Jose, CA (US); Shashank Merchant, Sunnyvale, CA (US)

(73) Assignee: Roku, Inc., San Jose, CA (US)

(*) Notice: Subject to any disclaimer, the term of this patent is extended or adjusted under 35 U.S.C. 154(b) by 99 days.

This patent is subject to a terminal disclaimer.

(21) Appl. No.: 16/929,858

(22) Filed: Jul. 15, 2020

Related U.S. Application Data

(63) Continuation of application No. 15/456,861, filed on Mar. 13, 2017, now Pat. No. 10,956,484.
(Continued)

(51) Int. Cl.
| | | |
|---|---|---|
| *G06F 16/45* | (2019.01) | |
| *G06F 16/48* | (2019.01) | |
| *G06F 16/906* | (2019.01) | |
| *G06F 16/44* | (2019.01) | |

(52) U.S. Cl.
CPC ............. *G06F 16/45* (2019.01); *G06F 16/48* (2019.01); *G06F 16/44* (2019.01); *G06F 16/906* (2019.01)

(58) Field of Classification Search
CPC ........ G06F 16/40; G06F 16/45; G06F 16/144; G06F 16/90; G06F 16/906; G06F 16/48; G06F 16/43
See application file for complete search history.

(56) References Cited

U.S. PATENT DOCUMENTS

| | | |
|---|---|---|
| 8,171,030 B2 | 5/2012 | Pereira et al. |
| 8,189,945 B2 | 5/2012 | Stojancic et al. |
| (Continued) | | |

OTHER PUBLICATIONS

Unpublished U.S. Appl. No. 13/076,628, filed Mar. 31, 2011.
Unpublished U.S. Provisional U.S. Appl. No. 61/940,921, filed Feb. 18, 2014.

*Primary Examiner* — Ashish Thomas
*Assistant Examiner* — Jedidiah P Ferrer
(74) *Attorney, Agent, or Firm* — McDonnell Boehnen Hulbert & Berghoff LLP

(57) ABSTRACT

Techniques are described that exclude use of "stop-fingerprints" from media database formation and search query to an automatic content recognition (ACR) systems based on media content fingerprints updated by stop-fingerprint analysis. A classification process is presented which takes in fingerprints from reference media files as an input and produces a modified set of fingerprints as an output by applying a novel stop-fingerprint classification algorithm. Architecture for the distributed stop-fingerprint generation is presented. Various cases, as stop-fingerprints generation for the entire reference database, stop-fingerprints generation for the individual reference fingerprint files, and temporal fingerprint classification obtained through intermediate steps of the temporal fingerprint classification algorithm are presented. A hash-based signature classification algorithm is also described.

15 Claims, 15 Drawing Sheets

Related U.S. Application Data

(60) Provisional application No. 62/306,700, filed on Mar. 11, 2016, provisional application No. 62/306,707, filed on Mar. 11, 2016, provisional application No. 62/306,719, filed on Mar. 11, 2016.

(56) References Cited

U.S. PATENT DOCUMENTS

| | | |
|---|---|---|
| 8,195,689 B2 | 6/2012 | Ramanathan et al. |
| 8,229,227 B2 | 7/2012 | Stojancic et al. |
| 8,335,786 B2 | 12/2012 | Pereira et al. |
| 8,385,644 B2 | 2/2013 | Stojancic et al. |
| 8,655,878 B1 | 2/2014 | Kulkarni et al. |
| 8,666,152 B1 | 3/2014 | Ramanathan et al. |
| 8,959,108 B2 | 2/2015 | Pereira et al. |
| 9,230,172 B2 | 1/2016 | Holzschneider et al. |
| 9,299,364 B1 | 3/2016 | Pereira et al. |
| 9,313,359 B1 | 4/2016 | Stojancic et al. |
| 9,376,544 B2 | 6/2016 | Stojancic et al. |
| 9,386,037 B1 | 7/2016 | Hunt et al. |
| 9,430,164 B1 | 8/2016 | Botelho et al. |
| 9,510,044 B1 | 11/2016 | Pereira et al. |
| 9,753,964 B1 | 9/2017 | Marshall et al. |
| 10,430,383 B1 * | 10/2019 | Menezes ............. G06F 16/1734 |
| 2013/0163888 A1 * | 6/2013 | Montalvo ............... G06F 16/48 |
| | | 382/225 |
| 2015/0186405 A1 * | 7/2015 | Raichelgauz ....... G06F 16/2228 |
| | | 707/692 |
| 2015/0213049 A1 | 7/2015 | Kleiman et al. |

\* cited by examiner

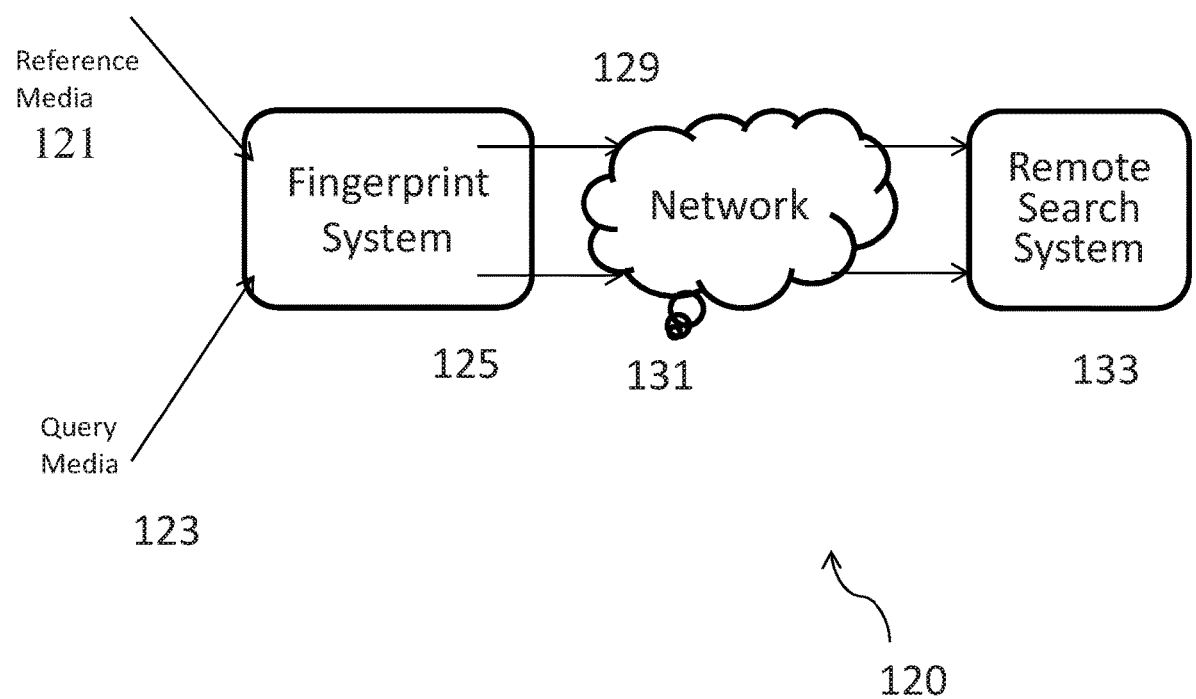
Fig 1B – Exemplary ACR

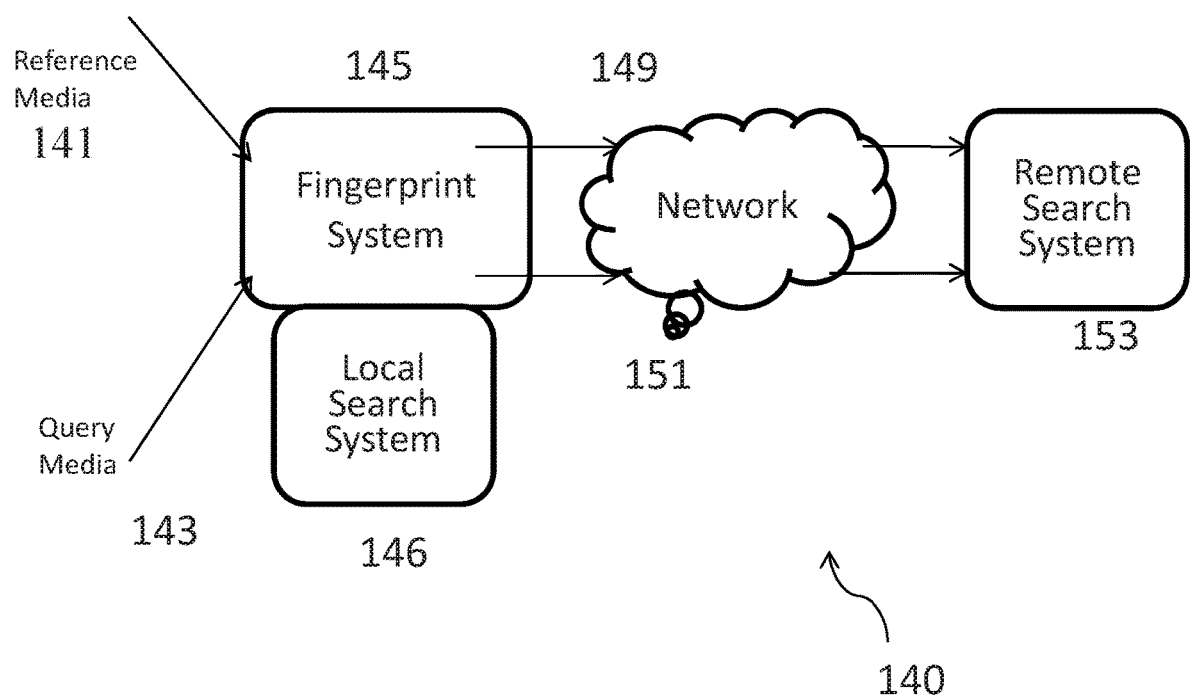
Fig 1C – Exemplary ACR

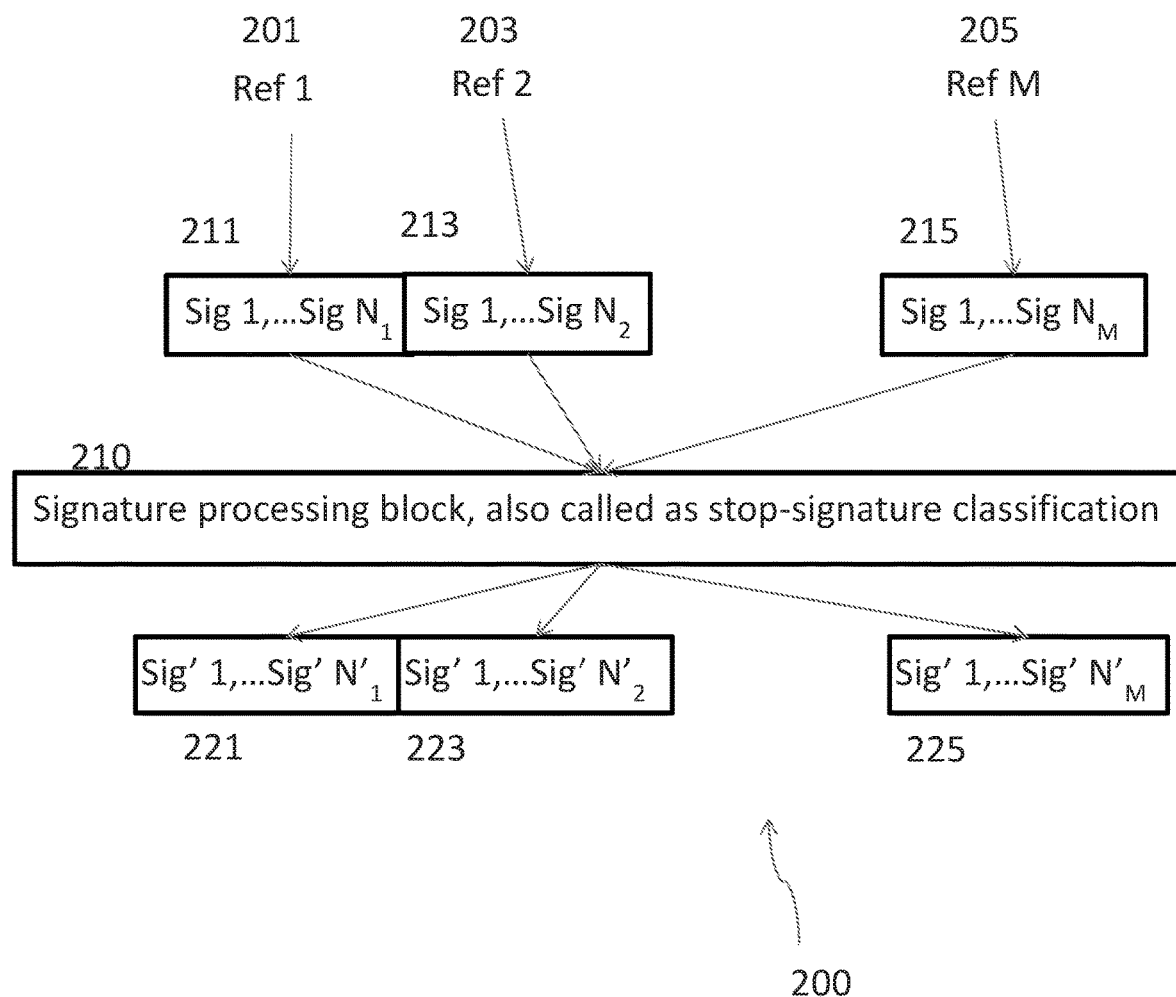
Fig. 2A – Exemplary Centralized Fingerprint Signature Classification Process

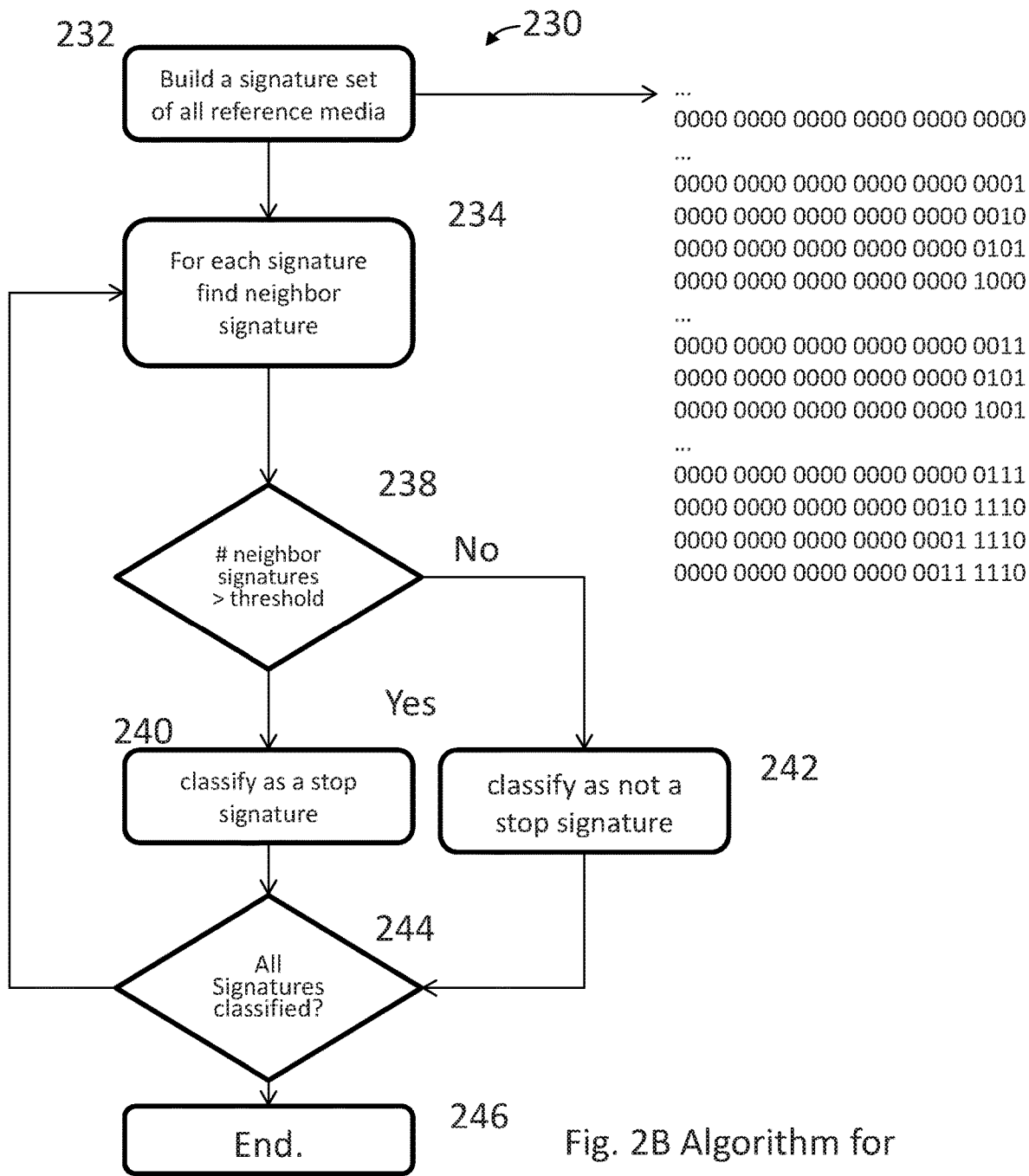

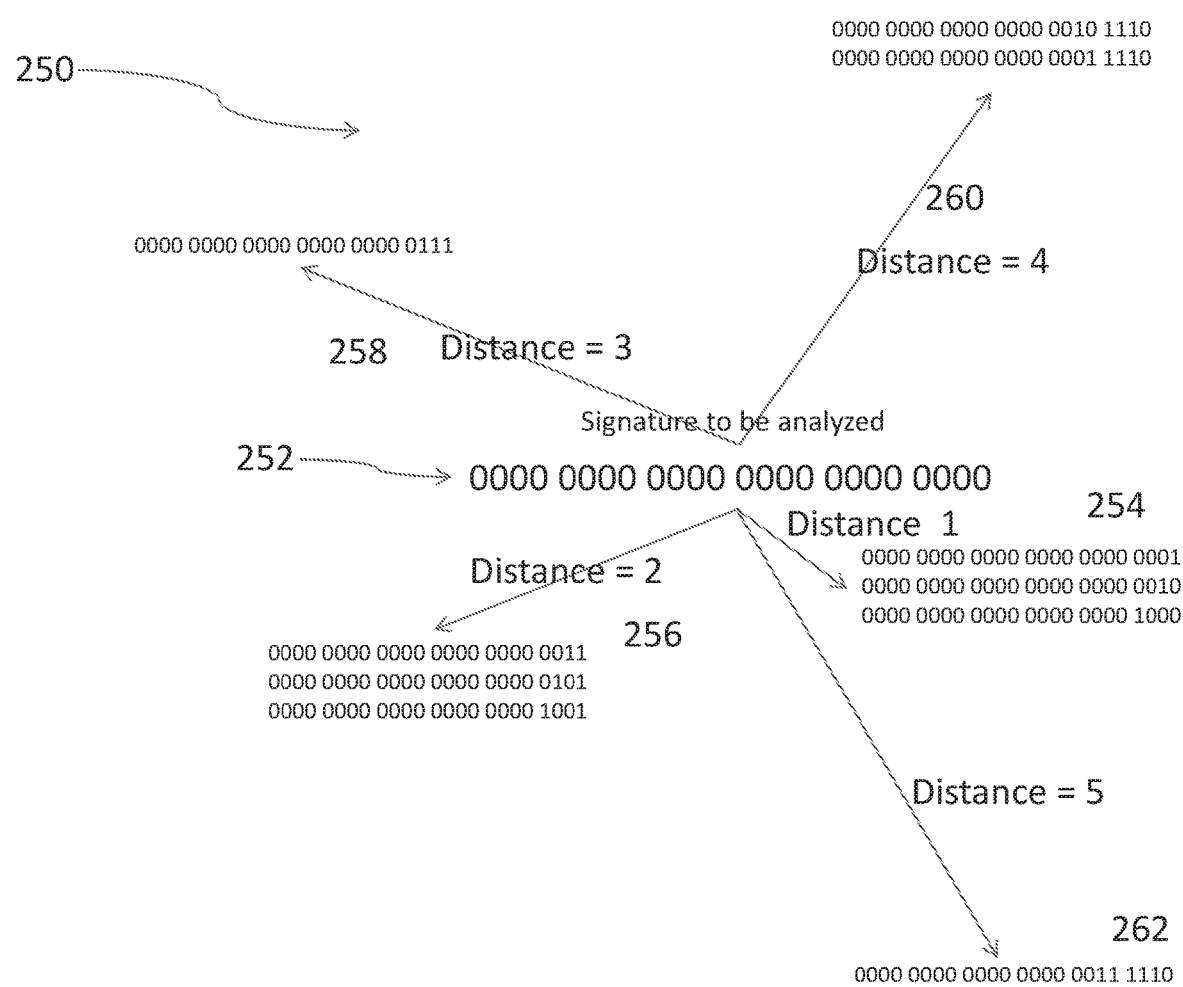
Fig. 2C – An example of signature classification

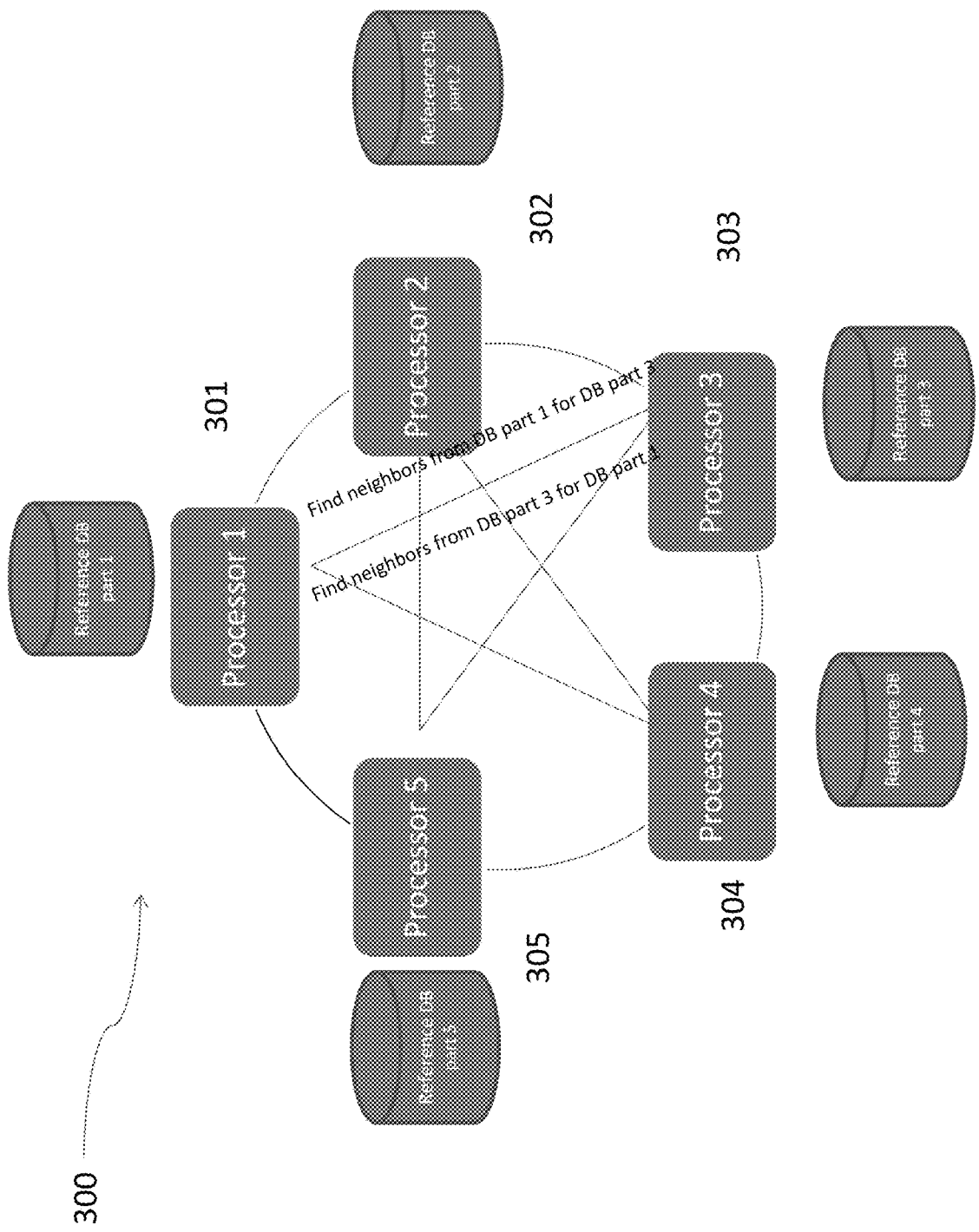
Fig. 3 – Distributed signature classification

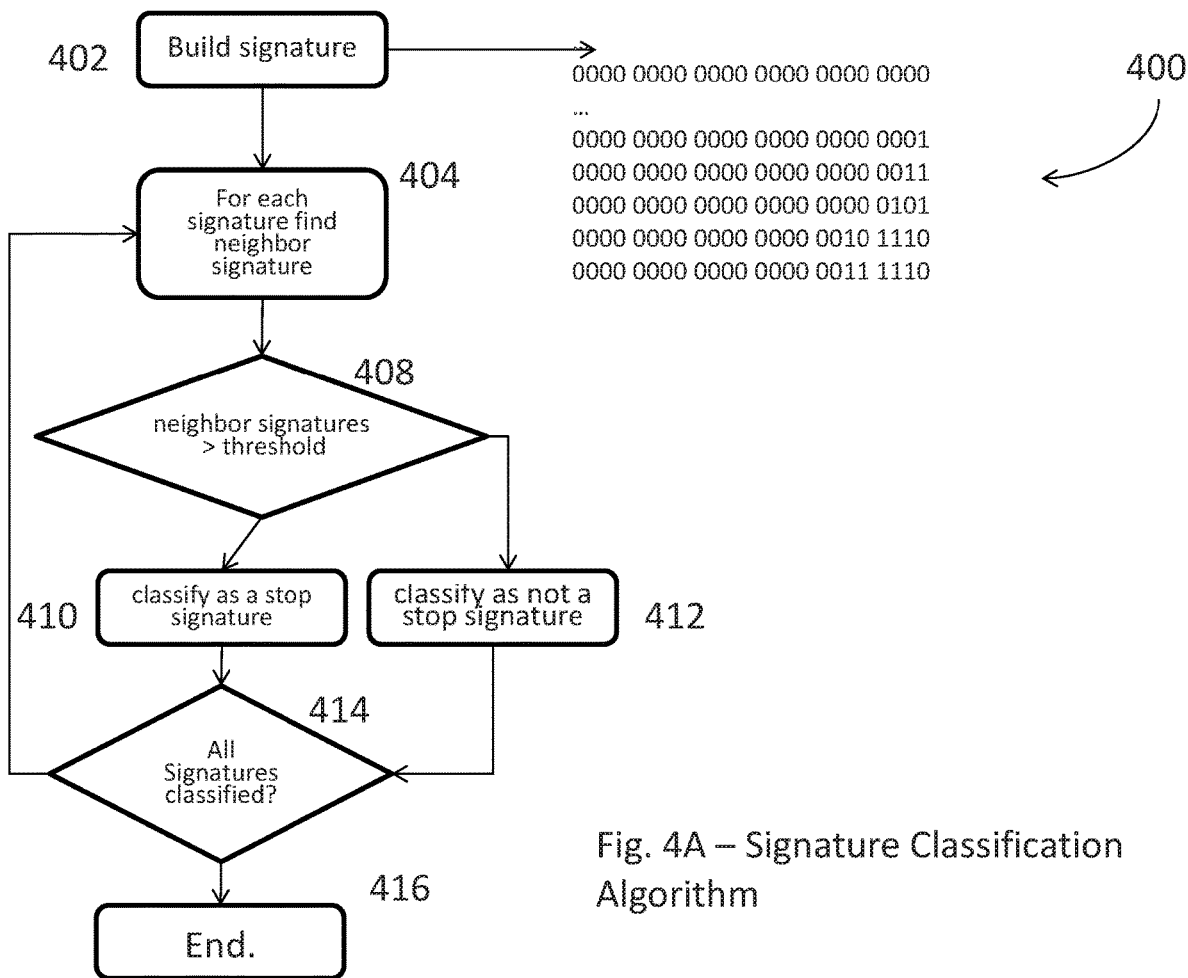
Fig. 4A – Signature Classification Algorithm

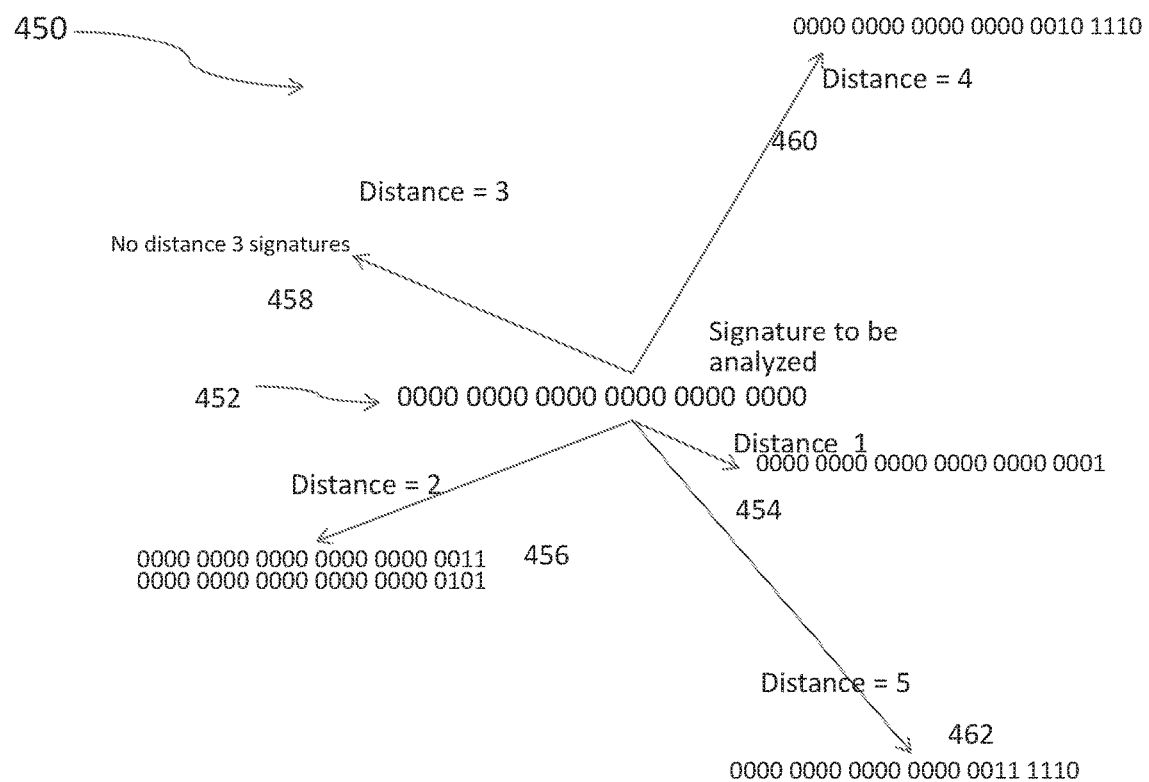
Fig. 4 B – An example of signature classification for individual reference

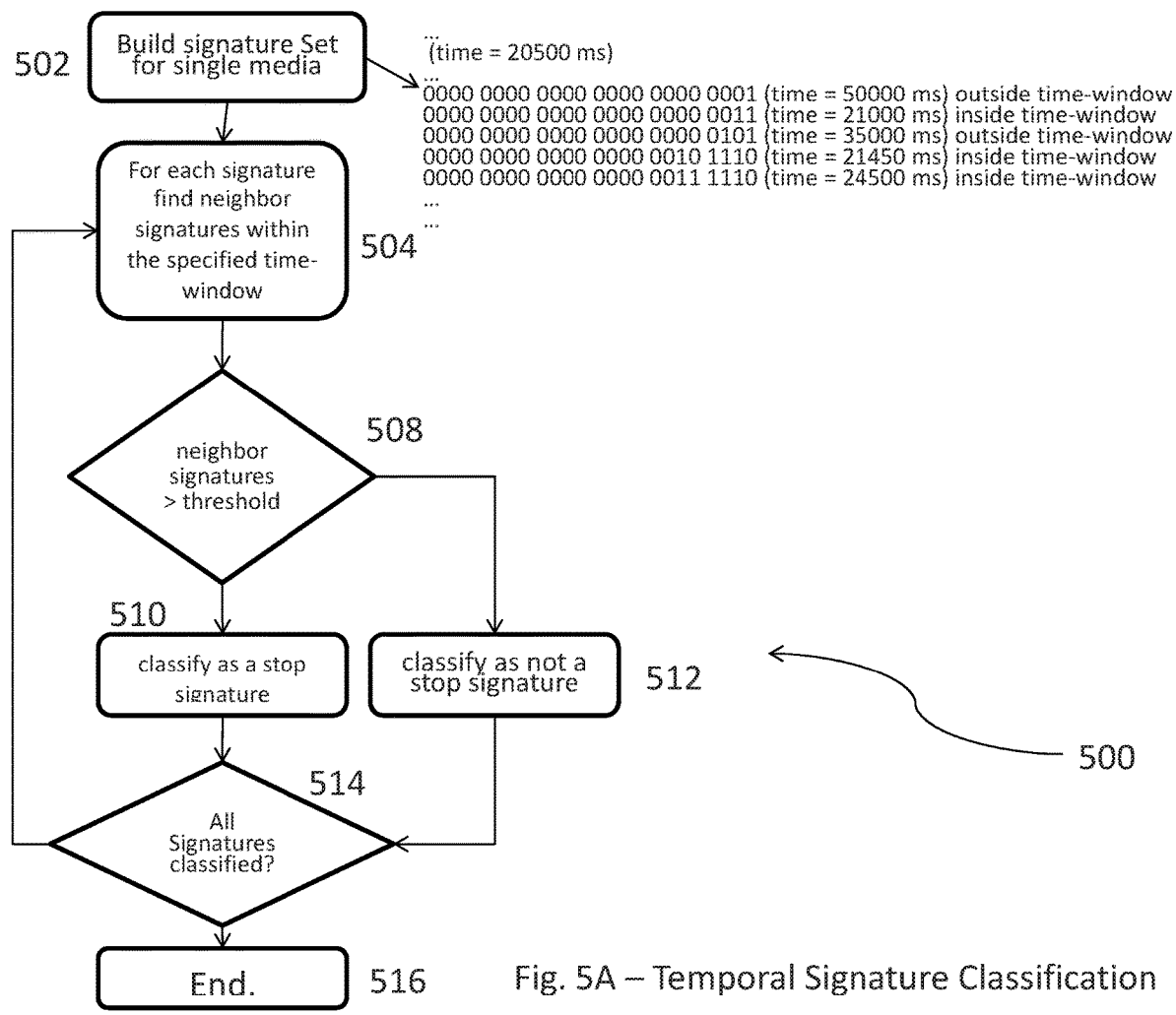
Fig. 5A – Temporal Signature Classification

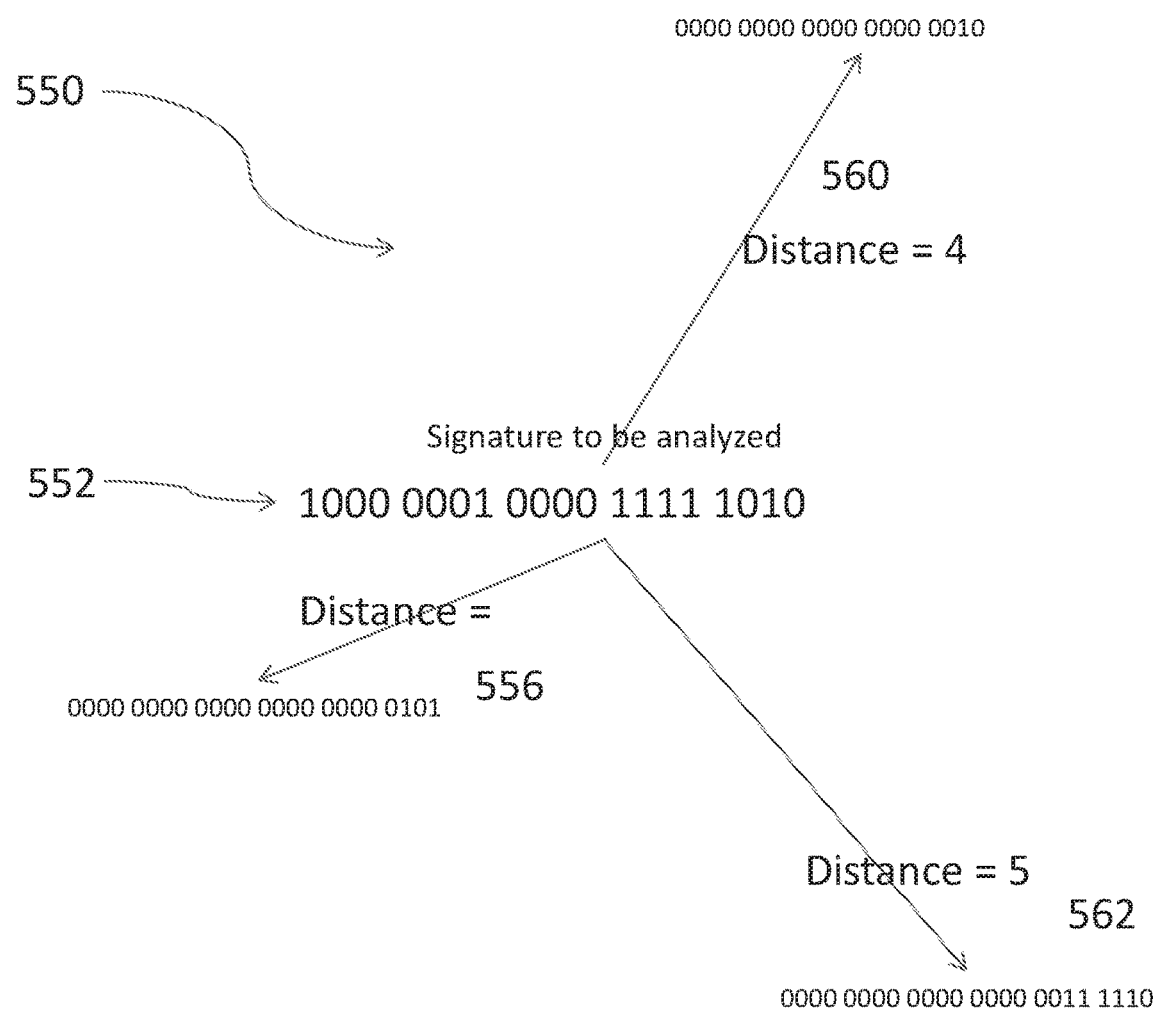
Fig. 5 B - An example of temporal signature classification

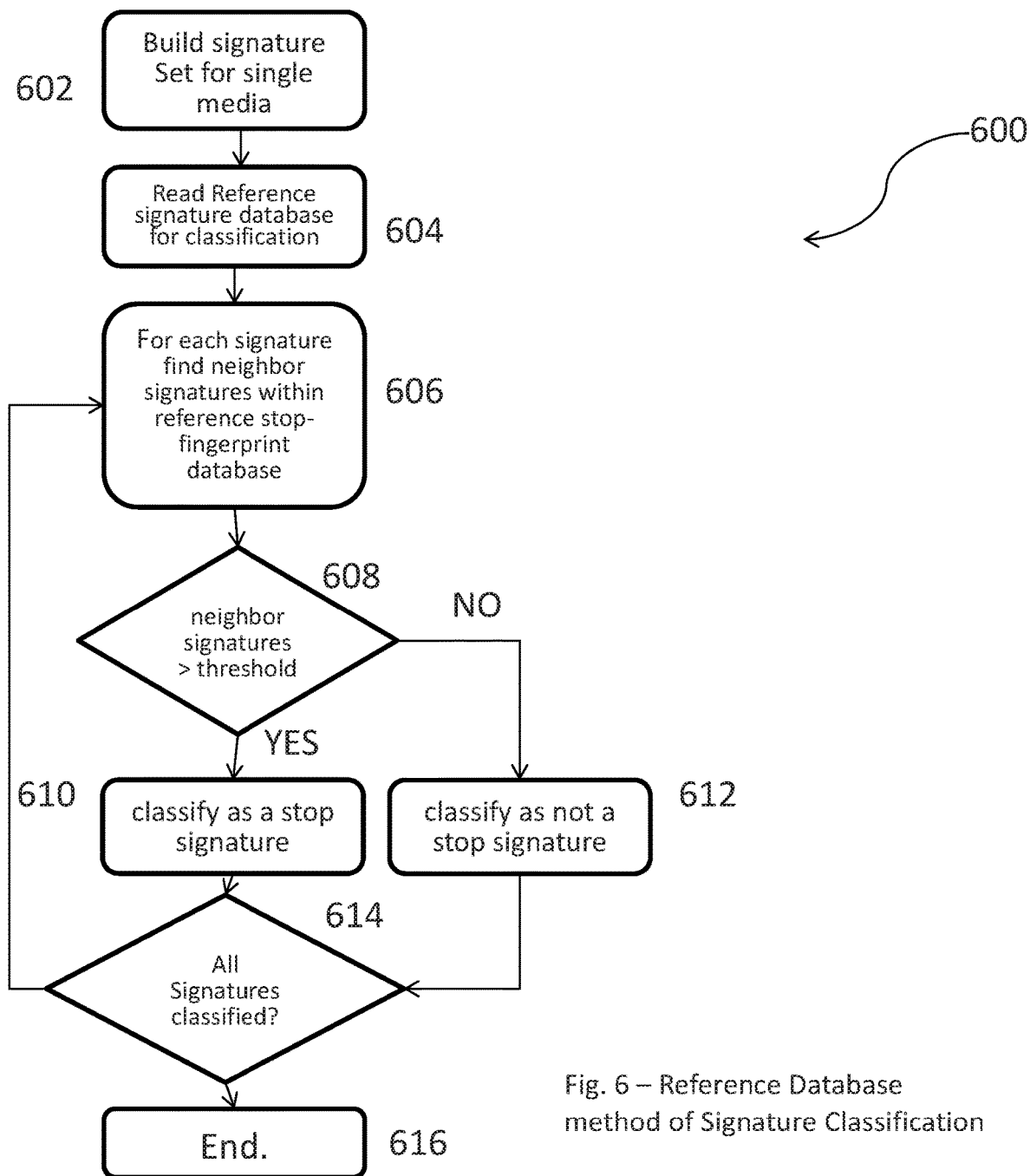
Fig. 6 – Reference Database method of Signature Classification

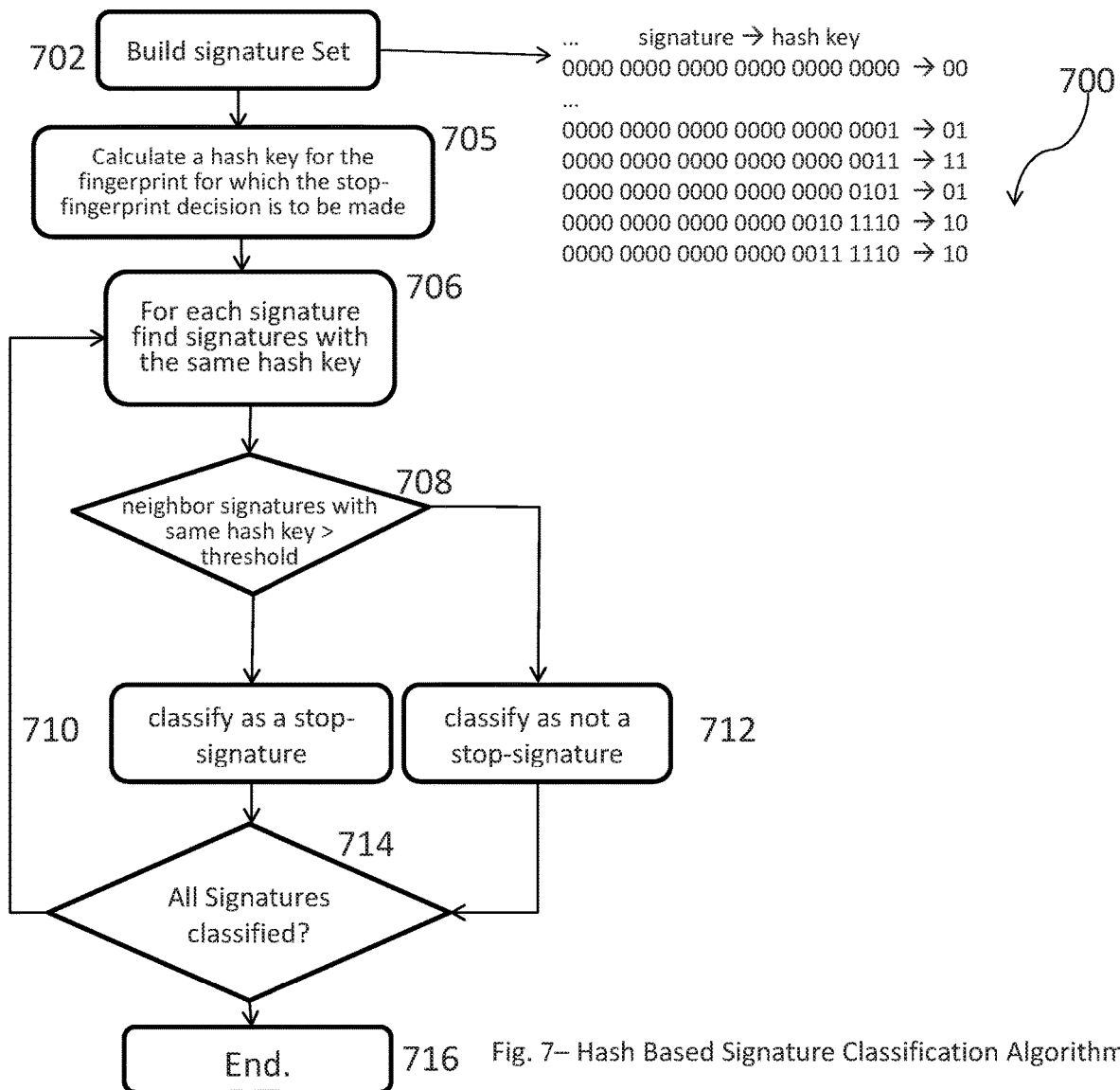
Fig. 7– Hash Based Signature Classification Algorithm

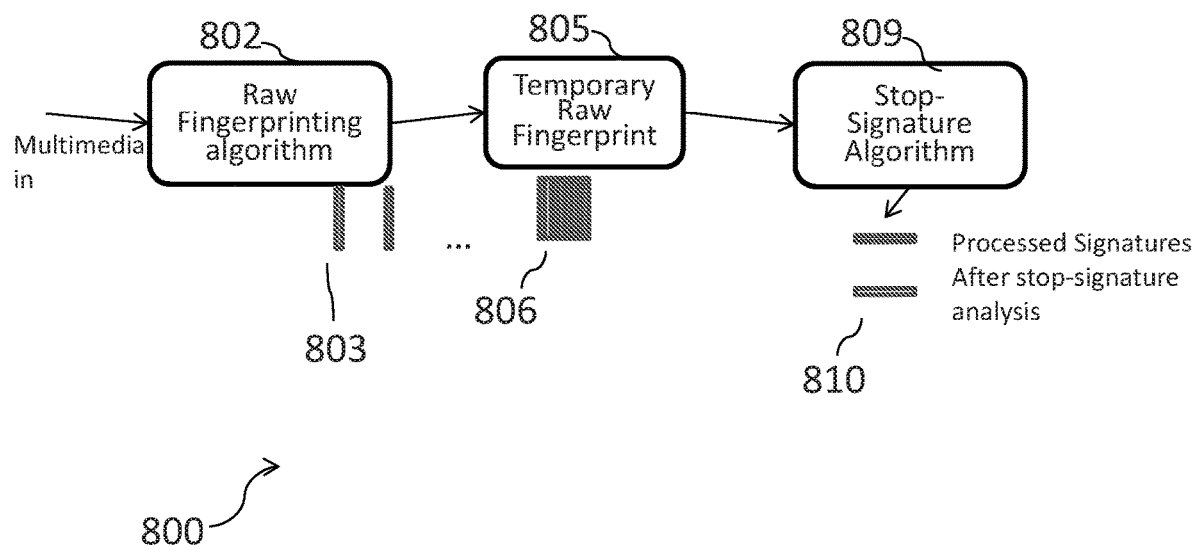
Fig. 8 – Schematic for Stop-signature Analysis at the Fingerprint stage

METHOD TO DIFFERENTIATE AND CLASSIFY FINGERPRINTS USING FINGERPRINT NEIGHBORHOOD ANALYSIS

The present application is a continuation of U.S. patent application Ser. No. 15/456,861 filed Mar. 13, 2017 entitled "Method To Differentiate and Classify Fingerprints Using Fingerprint Neighborhood Analysis", which claims the benefit of U.S. Provisional Patent Application No. 62/306,700 filed on Mar. 11, 2016 entitled "A Method To Differentiate and Classify Fingerprints Using Fingerprint Neighborhood Analysis"; U.S. Provisional Patent Application No. 62/306,719 filed on Mar. 11, 2016 entitled "Digital Video Fingerprinting Using Motion Segmentation"; and U.S. Provisional Patent Application No. 62/306,707 filed on Mar. 11, 2016 entitled "Robust Audio Identification with Interference Cancellation"; the disclosures of which are hereby incorporated by reference herein in their respective entireties.

CROSS REFERENCE TO RELATED APPLICATIONS

U.S. Pat. No. 8,229,227 filed Jun. 18, 2008 entitled "Methods and Apparatus for Providing a Scalable Identification of Digital Video Sequences"; U.S. Pat. No. 8,171,030 filed on Jun. 18, 2008 entitled "Methods and Apparatus for Multi-Dimensional Content Search and Video Identification"; U.S. Pat. No. 8,385,644 filed Jun. 25, 2009 entitled "Digital Video Fingerprinting Based on Resultant Weighted Gradient Orientation Computation"; U.S. Pat. No. 8,189,945 filed Nov. 5, 2009 entitled "Digital Video Content Fingerprinting Based on Scale Invariant Interest Region Detection with an Array of Anisotropic Filters"; U.S. Pat. No. 8,195,689 filed May 3, 2010 entitled "Media Fingerprinting and Identification System"; U.S. Pat. No. 8,335,786 filed May 27, 2010 entitled "Multi-Media Content Identification Using Multi-Level Content Signature Correlation and Fast Similarity Search"; U.S. Pat. No. 8,666,152 filed Nov. 29, 2010 entitled "Digital Video Content Fingerprinting Using Image Pixel Intensity and Color Information"; U.S. patent application Ser. No. 13/076,628 filed Mar. 31, 2011 entitled "Scale/Affine Invariant Interest Region Detection with an Array of Anisotropic Filters for Video Fingerprinting"; U.S. Pat. No. 8,655,878 filed May 6, 2011 entitled "A Scalable, Adaptable, and Manageable System for Multimedia Identification"; U.S. Pat. No. 8,959,108 filed Oct. 18, 2011 entitled "Distributed and Tiered Architecture for Content Search and Content Monitoring"; U.S. Pat. No. 9,510,044 filed Dec. 15, 2011 entitled "TV Content Segmentation, Categorization and Identification and Time-Aligned Applications"; U.S. Pat. No. 9,313,359 filed Aug. 21, 2012 entitled "Media Content Identification on Mobile Devices"; U.S. Pat. No. 9,299,364 filed Oct. 9, 2012 entitled "Audio Content Fingerprinting Based on Two-Dimensional Constant Q-Factor Transform Representation and Robust Audio Identification for Time-Aligned Applications"; U.S. Pat. No. 9,367,544 filed Mar. 14, 2013 entitled "Method for Efficient Database Formation and Search on Media Devices Acting Synchronously with Television Programming"; and U.S. Provisional Patent Application Ser. No. 61/940,921 filed Feb. 18, 2014 entitled "A Method for Valuing and Targeting Advertising Using Media Content Recognition", have the same assignee as the present application, are related applications, and are hereby incorporated by reference in their entireties.

FIELD OF THE INVENTION

The present invention relates generally to improvements in audio and video media processing architectures and methods for feature extraction from a media sequence. More particularly, the present invention addresses methods and apparatuses for efficient signature generation for media database indexing and search.

BACKGROUND OF THE INVENTION

Media applications which include video and audio database management, database browsing and identification are undergoing explosive growth and are expected to continue to grow. To address this growth, there is a need for a comprehensive solution related to the problem of creating multimedia fingerprints and associated multimedia fingerprint databases that allows for efficient querying and content identification tolerant of multimedia content distortions. Multiple applications include audio and video media fingerprinting, database mining, copyright content detection for audio and video hosting web-sites, contextual advertising placement, and broadcast monitoring of video programming and advertisements.

SUMMARY OF THE INVENTION

In one or more of its several aspects, the present invention addresses the problems outlined in the previous section. One embodiment of the invention presents a method for characterization and classification of multimedia fingerprints based on the fingerprint neighborhood analysis. A stop-fingerprint rule is established for multimedia fingerprint neighborhood analysis wherein the stop-fingerprint rule consists of a measure of fingerprint distance from a reference fingerprint selected from a reference multimedia fingerprint database to fingerprints in a stop-fingerprint reference database. Multimedia fingerprints are classified into unique and non-unique fingerprints by applying the stop-fingerprint rule on each fingerprint in the reference multimedia fingerprint database.

Another embodiment of the invention addresses a method for temporal stop-fingerprint classification. Fingerprints are selected having timestamps that meets a time window criteria. A fingerprint distance is measured from each fingerprint that meets the time window criteria to fingerprints in a fingerprint reference database. Each fingerprint that meets the time window criteria and has a selected number of fingerprints within a threshold distance is classified as a non-unique stop-fingerprint.

A further embodiment of the invention addresses a method for hash key utilization for stop-fingerprint classification. Fingerprints, which are also referred to herein as signatures, and associated hash keys are generated. A fingerprint distance (or signature distance) is measured from each fingerprint with a hash key to fingerprints having the same hash key selected from a fingerprint reference database. Each fingerprint with a hash key that has a selected number of fingerprints within a threshold distance is classified as a non-unique stop-fingerprint.

BRIEF DESCRIPTION OF THE DRAWINGS

Exemplary embodiments of the present invention will become more fully apparent from the following description and appended claims, taken in conjunction with the accompanying drawings. Understanding that these drawings depict only exemplary embodiments and are, therefore, not to be considered limiting of the present invention's scope, the exemplary embodiments of the present invention will be described with additional specificity and detail through use of the accompanying drawings in which:

FIG. 1B illustrates an exemplary automatic content recognition (ACR) system for both audio and video media consisting of a fingerprint system and remote search system in accordance with an embodiment of the present invention;

FIG. 1C illustrates an exemplary automatic content recognition (ACR) system for both audio and video media consisting of a fingerprint system, a local search system, and a remote search system in accordance with an embodiment of the present invention;

FIG. 2A illustrates an exemplary centralized fingerprint classification process which takes in fingerprints from reference media files as an input and produces a modified set of fingerprints as an output by applying a stop-fingerprint classification algorithm in accordance with an embodiment of the present invention;

FIG. 2B illustrates an algorithm for stop-fingerprint classification in accordance with an embodiment of the present invention;

FIG. 2C illustrates an exemplary fingerprint and its neighbors obtained through intermediate steps of the stop-fingerprint generation algorithm;

FIG. 3 illustrates an exemplary distributed processor organization for the distributed stop-fingerprint classification method in accordance with an embodiment of the present invention;

FIG. 4A illustrates an algorithm to generate stop-fingerprints for individual reference fingerprint files in accordance with an embodiment of the present invention;

FIG. 4B illustrates an exemplary fingerprint and its neighbors obtained through intermediate steps of the stop-fingerprint generation algorithm for individual reference in accordance with an embodiment of the present invention;

FIG. 5A illustrates a temporal fingerprint classification algorithm in accordance with an embodiment of the present invention;

FIG. 5B illustrates an exemplary fingerprint and its neighbors obtained through intermediate steps of the temporal fingerprint classification algorithm in accordance with an embodiment of the present invention;

FIG. 6 illustrates a reference database based stop-fingerprint process in accordance with an embodiment of the present invention;

FIG. 7 illustrate as hash-based signature classification algorithm in accordance with an embodiment of the present invention;

FIG. 8 illustrates a schematic diagram for signature classification algorithm running at fingerprint client in accordance with an embodiment of the present invention.

DETAILED DESCRIPTION

Figure 1A:
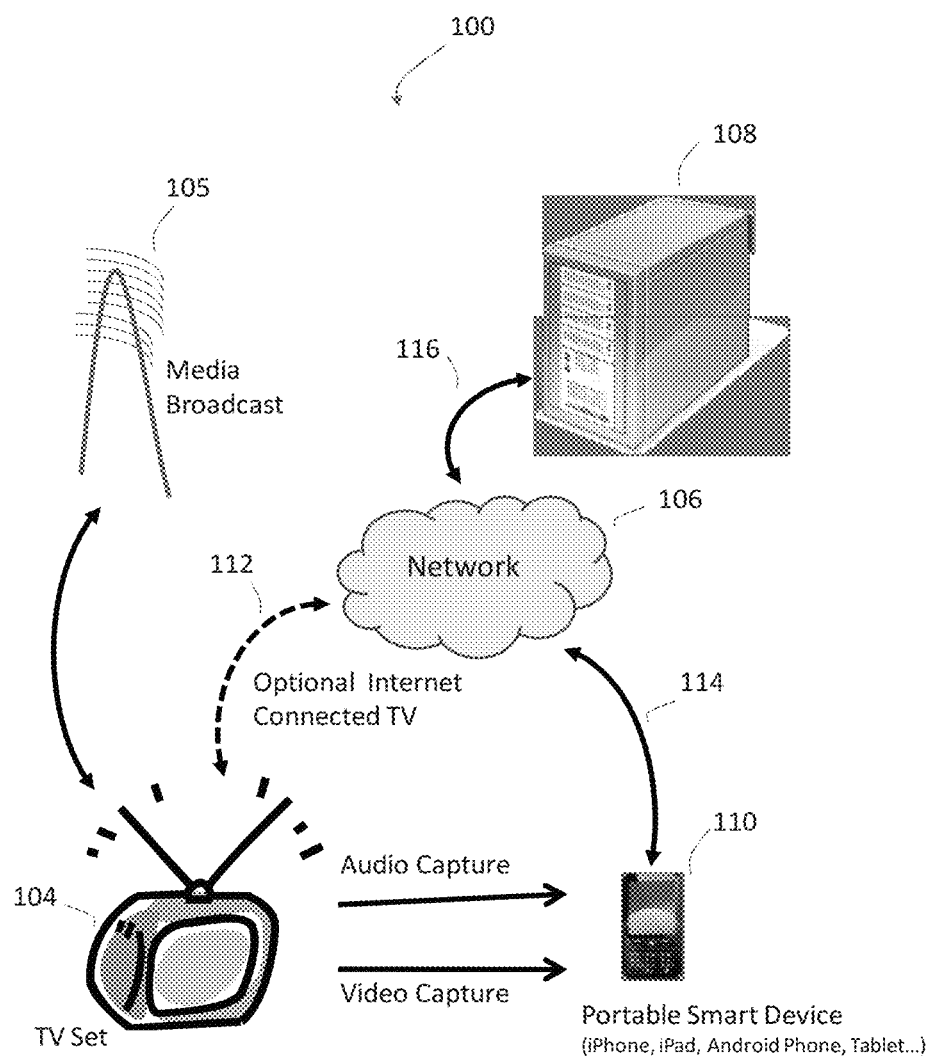
FIG. 1A illustrates a system for providing audio and video stop-fingerprint classification and fingerprint reduction on a media device in accordance with an embodiment of the present invention.

The present invention will now be described more fully with reference to the accompanying drawings, in which several embodiments of the present invention are shown. This invention may, however, be embodied in various forms and should not be construed as being limited to the embodiments set forth herein. Rather, these embodiments are provided so that this disclosure will be thorough and complete, and will fully convey the scope of the present invention to those skilled in the art.

It is appreciated that the present disclosure may be embodied as methods, systems, or computer program products. Accordingly, the present inventive concepts disclosed herein may take the form of a hardware embodiment, a software embodiment or an embodiment combining software and hardware aspects. Furthermore, the present inventive concepts disclosed herein may take the form of a computer program product on a computer readable storage medium having non-transitory computer usable program code embodied in the medium.

Those of skill in the art will appreciate from the present disclosure additional, alternative systems and methods for multimedia fingerprints differentiation and classification that follow the same principles and methods as those described herein.

Multimedia fingerprinting refers to the ability to generate associated identifying data, referred to as fingerprints, from the multimedia image, audio and video content. A fingerprint has the following properties: it is much smaller than the original data; it can be efficiently searched for in a large database of fingerprints; the original multimedia content cannot be reconstructed from the fingerprint; and for multimedia content that is a distorted version of another multimedia content, fingerprints of the original and distorted versions are similar. Examples of some common multimedia distortions include, selecting a clip of video content temporally, cropping the image data, re-encoding the image or audio data to a lower bit rate, changing a frame rate of the video or audio content, re-recording the multimedia data via some analog medium such as a camcorder in a movie theatre, and changing the aspect ratio of the image content. A fingerprinting and search system that is robust to the above multimedia content distortions is preferable to other methods of content identification. One example of an alternative multimedia content identification is multimedia content watermarking system. However, the watermarking changes the multimedia content by inserting watermark data, which is not desirable in many applications. On the other hand, unlike multimedia watermarking, fingerprinting does not change the multimedia content allowing the fingerprinting reference database and queries to be formed at many points in the standard broadcast flow.

Multimedia fingerprinting is a challenging problem. Hence, many fingerprints related to portions of the multimedia content may not adequately and unambiguously represent the content. It is advantageous to be able to analyze generated fingerprints and partition them into a set of useful and non-useful fingerprints for the purpose of more efficient database query and content identification.

Multimedia fingerprint database formation and query is in some aspects analogous to the text document database formation and query. Various methods for searching a set of text documents through text queries have been developed. Many of these search methods utilize the words and phrases in a document as keywords or features. From these keywords various linguistic, probabilistic, information theoretic, algebraic, fuzzy, vector space models are built. However there are many words such as "the, a, and, but, etc . . . " that are very common across many documents which carry almost no specific information. Such words are termed as "stop words" in literature as these words are eliminated from further processing for the purpose of search. Inclusion of such words in the search may degrade the quality of search results.

In the machine learning and artificial intelligence community, common approaches to select distinguishing features are based on information theory and probability theory.

Discriminant analysis, adaptive tree, and conditional probabilities are some methods that separate a feature set into useful and not-useful features. A list of "stop words" for the text search can also be generated using these more sophisticated approaches. When the problem size becomes much larger, such complex methods to select useful features from a very large feature set become computationally infeasible with the above mentioned methods. Instead, simple methods to analyze (and characterize) useful and not-useful features based on precision and recall may perform equally well. Simple methods of eliminating words that occur in more than some threshold fraction of documents also can generate a list of stop words without much computational overhead. However when the feature set space is exceptionally large, or the feature space is continuous, then simple counting methods may not work.

One example of the application of the present invention is in automatic content recognition (ACR) systems. A typical ACR system consists of two system parts. The first part is the fingerprinting system which takes in the multimedia content and generates a sequence of features, also termed as fingerprints or signatures for the content. The fingerprints can be represented in various ways. For example a fingerprint can be a binary sequence of 0's and 1's, or it can be an integer or it can be a vector of integers, etc. For a defined type of fingerprint a distance measure that compares two fingerprints and outputs a similarity measure is assumed to be defined. For example, for a binary fingerprint the hamming distance, i.e. the number of places at which the two fingerprints differ, can be taken as a distance measure. Using the techniques outlined in this disclosure one can improve the ACR search results and search performances.

FIG. 1A illustrates a system 100 for providing audio and video stop-fingerprint classification and fingerprint reduction on a media device. The system 100 includes a media presentation device 104, such as a television set, a desktop, laptop, or tablet computer, a digital video disc (DVD) player, or a smartphone device configured to display media programming, such as television programs, movies, Internet videos, or the like, or play audio media such as wireless received radio signals, compact discs (CDs), or the like. The media presentation device 104, such as a television set, may be connected to a remote media broadcast system 105 for receiving television programming content. Also, the media presentation device 104 may or may not be connected to the Internet 106. The system 100 also includes a remote content identification system 108 and a mobile media device 110 connected over the Internet 106 to the remote content identification system 108. The mobile media device 110 includes a smartphone device, a laptop, a tablet computer, or the like. Set top boxes and gaming machines may also act as a media device that is placed intermediate between an external search server and the mobile media device 110, having a remote database that is a subset of an external search server database but of greater capacity than a local reference database on the mobile media device 110. Connections 112, 114, and 116 may be wired or cabled connections, wireless connections, or a combination of wire cable and wireless connections. For example, the mobile media device 110 may connect wirelessly to the Internet 106 through a wireless router or over 3G or 4G networks while the remote content identification system 108 may be wire or cable attached through a modem to the Internet 106. The mobile media device 110 may be configured to acquire audio signals from the media presentation device 104 by use of a microphone. The mobile media device 110 may also be configured to acquire images or a video from the media presentation device 104 by use of an image sensor or camera, such as a charge coupled device (CCD) image sensor and a camera lens assembly included in the mobile media device 110.

Illustrated system 100 supports applications on the mobile media device 110 that operate in real time and in accordance with television or other media programming content that is being presented on a media presentation device 104 and received by the mobile media device 110. The mobile media device 110 is configured to acquire a temporal fragment of media content, including audio content, video content, or both, that are playing on the media presentation device 104, using the mobile device's microphone, camera, or both, and generates query fingerprints from the temporal fragment of the acquired media content. Also, the media presentation device 104 may be considered a smart presentation device and may also generate query fingerprints from temporal fragments of content presented on the media presentation device 104. For instance, the media presentation device 104 may be configured to generate a query fingerprint from incoming media (e.g., audio and/or video) that is being presented on the device. Thus, the media presentation device 104 may take advantage of the processes and techniques as presented herein in relation to the mobile media device 110.

A chunk of the query fingerprints is a set of the query fingerprints corresponding to a time segment of the query media signal. Also, a digest of the chunk of the query fingerprints may be formulated as a search query to a local search database on the mobile media device 110 or transmitted to the remote content identification system 108, also referred to as an external search database or a remote search server 108, for content identification. A digest of the query fingerprints is a summarization of the fingerprints generated for the acquired media content. If the search query is found in a reference database either local or remote, the search process provides responsive data, such as a title and timing information of the identified media content, along with related metadata, and sends the title, the timing information, and the related metadata to the application that initiated the query on the mobile media device 110. The original chunk of query reference fingerprints or the digest of the query fingerprints found on the remote search server 108 is stored on the mobile media device 110 for further use in local querying a mobile media device database located on the mobile media device 110 and tracking of media content. The method presented automatically switches between remote search on an external search server, and local search on a local reference database on the mobile media device. The local reference database is also described as a signature cache.

The mobile media device 110 may be configured to continuously listen, observe, or listen and observe the media programming content. The programming content may also be tracked by querying locally stored mobile media device reference content. If a change in the media programming content is detected, the mobile media device 110 generates one or more new queries that are searched for content identification. This process continues as long as the mobile media device 110 is listening to, and or observing video, or both with respect to the media programming content.

The mobile media device 110 may be equipped with an actionable program event detection system, which generates an action signal upon detection of a particular audio, video, or audio and video fragment stored in the reference fingerprint database. A software application running on the mobile media device 110 can then perform actions based on local search results, presenting to the user a variety of additional information on the same mobile media device 110 in real time while the remote media programming is still playing the associated media content.

The method presented automatically switches between a remote search on the external search database 108, and a local search on a "micro search server" on the mobile media device 110 (e.g., a local cache).

FIG. 1B illustrates a conceptual ACR system 120 for audio and/or video media consisting of a fingerprint system 125 and remote search system 133 in accordance with an embodiment of the present invention. The fingerprint system takes in a reference media file 121 and sends 129 the generated fingerprints to the remote search system 133 for addition into its database of reference fingerprints. The query media file 123 is also fingerprinted by the fingerprinting (FP) system 125 and the resulting fingerprints are sent 111 to the remote search system 133 to be compared with the reference fingerprint database.

The search system first may choose to pre-process these fingerprints in various ways. An example of such pre-processing as mentioned in the introduction is to exclude some of the fingerprints that satisfy the criteria of stop-fingerprints and not to include these stop-fingerprints into the remote search fingerprint database. Stop-fingerprints may represent non-unique fingerprints and non stop-fingerprints represent unique fingerprints. In some examples, the stop-fingerprints are those with a less than threshold-extent of uniqueness when compared with other reference fingerprints (e.g., as defined by the number of reference fingerprints within a threshold fingerprint distance of that stop-fingerprint, perhaps within a particular temporal range of the reference media content). The excluded stop-fingerprints may be deleted in some applications, reserved for further analysis by updated algorithms, or saved in stop-fingerprint storage locations separate from the search fingerprint database. The stop-fingerprint calculations on the fingerprint side is generally limited to temporal calculations whether the fingerprints are calculated locally or on the remote server. Stop-fingerprint calculations on the search side can be based on various approaches as described in more detail herein.

FIG. 1C illustrates an exemplary automatic content recognition (ACR) system 140 for both audio and video media consisting of a fingerprint system 145, a local search system 146, and a remote search system 153 in accordance with an embodiment of the present invention. The fingerprint system takes in a reference media file 141 and sends 129 the generated fingerprints to the search system 153 for addition into its database. The query media file 143 is also fingerprinted by the FP system 145 and the resulting fingerprints are sent 111 to the local search system 146 for comparison with the local fingerprint database. In a query operation, if a match is not found in the local fingerprint database, the query is sent to the remote search system 153 for further search in the larger remote fingerprint database.

The local search system 146 first may choose to pre-process these fingerprints in various ways. An example of such pre-processing as mentioned in the introduction is to exclude some of the fingerprints that satisfy the criteria of stop-fingerprints and not to include these stop-fingerprints into the local and remote search fingerprint database. Stop-fingerprints represent non-unique fingerprints and non stop-fingerprints represent unique fingerprints. The excluded stop-fingerprints may be deleted in some applications, reserved for further analysis by updated algorithms, or saved in stop-fingerprint storage locations separate from the search fingerprint databases.

Centralized stop-fingerprint classification method FIG. 2A 200 illustrates the concept of a processing step for fingerprint differentiation and classification. At the search system, fingerprints for all the reference multimedia content is available. Ref 1 201, Ref 2 203, . . . , Ref M 205 have corresponding fingerprints shown in fingerprint blocks 211, 213, . . . 215. The processing steps takes these fingerprints and generates the set of fingerprints shown in blocks 221, 223, . . . , 225. The fingerprints blocks in 221 and 211 may differ in the total number of fingerprints because some of the fingerprints from 211 would be termed as stop-fingerprints and may be removed from the set of fingerprints to be loaded. Optionally the fingerprints in 221 may be marked with additional information that is used by the search system.

FIG. 2B illustrates a process 230 for stop-fingerprint classification in accordance with an embodiment of the present invention. The stop-fingerprint classification algorithm starts with a set of reference media fingerprints which is built at step 232. At step 234, for each fingerprint in this set built at step 232, a set of neighboring fingerprints 236 is obtained. If the number of fingerprints in this set 236 is greater than a specified threshold 240 then the fingerprint is classified as a stop-fingerprint, otherwise it is classified as not a stop-fingerprint 242.

FIG. 2C shows an exemplary fingerprint with a set of neighboring fingerprints 250. For the fingerprint 252, no fingerprint with hamming distance of zero exists in the entire fingerprint set. However, three fingerprints 254 with hamming distance of one, three fingerprints 256 with hamming distance of two, one fingerprint 258 with hamming distance of three, two fingerprints 260 with hamming distance of four, and one fingerprint 262 with hamming distance of 5 are found in the whole fingerprint set. Thus fingerprint 252 has ten fingerprints within the hamming distance of five or less than five. If the rule to classify a fingerprint as a stop-fingerprint is "a fingerprint with more than 5 fingerprints within hamming distance of five is a stop-fingerprint" then, this fingerprint 252 would be categorized as a stop-fingerprint.

Stop-Fingerprint Definition

In the previous discussion we have assumed a single method of declaring a fingerprint as a stop-fingerprint. The method is based on the number of neighbors in a "Unit Ball", i.e. all the possible fingerprints around a signature with the specified distance measure in the fingerprint space. However, note the definition of the stop-fingerprint can easily be modified to account for different criteria. For example, instead of a Unit Ball, the criteria can specify a different shape or a functional representation of the distance with neighboring fingerprints and number of the neighboring fingerprints. A distance function different than the bit distance, such as the hamming distance, based on the characteristic of the fingerprints can also be defined. We provide one such example.

The Distance Weighted Neighbor Score—In this rule, for each fingerprints a neighbor score is defined as follows.

Let us define $neig_n$=number of neighbors with distance of n of a fingerprint being evaluated, such as fingerprint 252 of FIG. 2C. Then let us define a scoring function as follows.

$$score = 3 \times neig_0 + 2 \times neig_1 + neig_2$$

All fingerprints with a score more than a threshold are classified as stop-fingerprints. In some examples, the weighting applied to each $neig_n$ may take various values such that closer neighbors are provided greater weights when computing the value of score.

Effects of Database Update on Stop-Fingerprint Calculation

How the threshold and scoring function is selected depends on various factors. The selection may be selected empirically, that is informed by experimental results found to provide desired performance. An experimental set up may be used that consists of the set of reference videos and a set of scoring functions, threshold and associated stop-fingerprint classification rules to be explored, a set of training queries and a set of test queries. The stop-fingerprint scoring functions, thresholds and rules are ranked as per the results on the test queries and an optimum scoring function, thresholds and rules are selected.

Whenever fingerprints from a new reference media are added to the reference fingerprint database, the centralized stop-fingerprint algorithm needs to be rerun. Specifically the fingerprints from the previous reference fingerprints need to be compared against the fingerprints of the new reference media and the same scoring function, threshold, and rules are applied. In some examples, such as for a reference fingerprint database that is regularly updated with new reference fingerprints, the stop-fingerprint algorithm may be run periodically rather than following each update.

Consider two sets of fingerprints $s\_1$ and $s\_2$ where $s\_1$ is subset of $s\_2$. If the stop-fingerprint rule has the property that every stop-fingerprint as per the rule in set $s\_1$ is also a stop-fingerprint in the set $s\_2$ then when fingerprints from a new reference media are added then the stop-fingerprint calculations do not have to be redone for the fingerprints that have already been defined as stop-fingerprints. The algorithm needs to be applied to the fingerprints which have not been classified as stop-fingerprints. These non-stop-fingerprints are compared against the set of new fingerprints to be added into the database and the statistics of the neighbors is updated for these fingerprints. After this, the stop-fingerprints rule is applied. The new fingerprints to be added however are compared against all of the fingerprints including the stop-fingerprints to update the statistics of the neighbors.

As the non-stop fingerprints would remain non-stop fingerprints when fingerprints are deleted; if fingerprints from a particular media need to be deleted then neighbor statistics need to be updated only for the fingerprints that are declared as stop-fingerprints. Some stop-fingerprints may be reclassified as non-stop-fingerprints after this.

If a series of reference media additions and deletions are to be continued, then it is necessary to update the neighbor statistics for all fingerprints, irrespective of the stop-fingerprint or non-stop fingerprint classification. This makes the stop-fingerprint algorithm computationally heavy. It is noted that a distributed approach, described next, helps in scaling the stop fingerprint calculation when fingerprints are stored on various processing devices or servers.

Distributed Stop-Fingerprint Classification Method:

The method outlined in the FIG. 2A, 2B is a centralized stop-fingerprint categorization method. In this method the entire reference multimedia fingerprints are available at the single processor and the classification of the fingerprints into stop-fingerprints and non-stop-fingerprints is done by a single processor. However the same method can be modified to work in a distributed fashion if the reference database is split across different processors. FIG. 3 illustrates an exemplary distributed processor organization 300 for a distributed stop-fingerprint classification method in accordance with the present invention. Each processor 301-305 has a part of the whole reference fingerprints database. In this implementation each processor queries to each other processor and gets the details of the number of fingerprints within a specified range of distance. For example, processor 301 queries processor 303 to find neighbors from database (DB) part 3 for DB part 1. Also, processor 303 queries processor 301 to find neighbors from DB part 1 for DB part 3. After collecting the data from all the processors, the stop-fingerprint classification rule is applied to the fingerprints. Each processor, such as processor 302 has a part of the reference database. After each processor has calculated the neighboring fingerprints for each fingerprint in its databases, processor 302 contacts the rest of the processors 301, 303, 304, 305 having the other parts of database and receives the neighbor count for all fingerprints at all these reference databases. Then processors 301-305 applies the stop-fingerprint rule, such as a distance rule or applying a distance weighted neighbor score and threshold, to classify the fingerprints. Note that this algorithm can further be optimized to reduce the communication between various processors in various ways. For example every processor first runs the algorithm outlined in FIG. 2B with the part of the reference fingerprints that it has. It then runs the distributed algorithm as outlined before for the fingerprints which are not classified as stop-fingerprints. In this case, the information about only the non-stop fingerprints are shared between the processors. The stop fingerprints which are identified locally are used locally. The non stop-fingerprints on each processor are used identify additional stop word fingerprints. Alternatively, every processor may selectively communicate with few processors, based on the content of media they have stored in their local database, to gather the reference neighbor counts from that server. In this manner, the stop-fingerprint classification is applied to each category or within groups of related categories. Also, instead of receiving the count from all the processors, this approach receives the reference neighbor counts from only few of them. These selected processors may not provide 100% coverage, but tests have found that the information received covers a sufficiently a large universe of stop-word fingerprints and thereby improves the overall performance. In another alternative every processor may just work with its own fingerprints without obtaining neighbor counts from other processor. In this case the stop-fingerprint algorithm is applied not on the full database but only on the separate segments which may be categorized subsets of the full database. To cover the full database, a sixth processor, such as a remote server, is connected over a network, such as the Internet, to the other local segment processors to collect all the results and apply further processing as needed.

Individual Reference Stop-Fingerprint Classification Method

Various multimedia contain similar content at different time locations. For example, a musical piece may contain a piece of music that repeats itself periodically. In such cases the fingerprinting algorithm may generate the same fingerprints again and again. These fingerprints may need to be categorized as the stop-fingerprints because they do not convey unique information for the multimedia identification. To classify such fingerprints as stop-fingerprints, the algorithm outlined in FIG. 2B can be used separately on the fingerprints of each file. This method of stop-fingerprint classification is termed an individualized stop-fingerprint classification method that can be used on an individual file. FIG. 4A 400 illustrates the algorithm used for stop-fingerprint classification in this method. The algorithm 400 is same as the algorithm explained in the FIG. 2B where the only difference is that this algorithm 400 begins with a fingerprint set limited to a single reference media file 402 while the algorithm 230 begins with a fingerprint set 232 derived from fingerprint sets of all reference files. For example, the single reference media file 402 is an input file for which the fingerprints are generated. These generated fingerprints go through stop word calculations, in real time or offline, and are limited to that single file. The stop word fingerprint handling remains the same as the previous method, which allows it to be marked, deleted, and the like. FIG. 4B 450 shows how the stop-fingerprint classification gets modified in this approach compared to the centralized stop-fingerprint approach as outline in FIG. 2C 250. Compared to 250, the process 450, representing a subset of the DB limited to a single filed and used in process 250, has only two fingerprints 456 with distance of two, no fingerprint with a distance of three, and only one fingerprint 460 with a distance of distance of four. The number of fingerprints with bit distance of one 454 and five 462 remain the same. Note that the stop-fingerprint classification rule might be different than the one used in the algorithm 230.

If the rule to classify the fingerprint as a stop-fingerprint is "a fingerprint with more than 3 fingerprints within hamming distance of five is a stop-fingerprint" then, this fingerprint 452 would be categorized as a stop-fingerprint.

Temporal Stop-Fingerprint Classification Method

Previous methods of stop-fingerprint classification used an option that all fingerprints defined by a stop-fingerprint rule are deleted. Thus, all fingerprints associated with the repeated content get deleted and memory requirements are reduced. Hence, the ACR system would not be able to match a query coming from any part of the repetitive content against the reference. An alternative to deletion would be not to remove all of the repetitive fingerprints, but to keep some copies of such fingerprints. Another approach would be to keep a separate reference database of fingerprints that have been classified as stop-fingerprints and use those in search. Note that one set of stop-fingerprints may represent multiple repeated sections of media, such as a repeated commercial or promo within linear media content stream (or broadcast), and thus including this one set of stop fingerprints in a general search still saves search time. To implement the first solution, the particular fingerprints that are repeated would need to be identified. Once identified, only a single copy of each fingerprint would be classified as non-stop-fingerprint. However the fingerprints generated by the FP system for repetitive content may not be exactly same because of small differences (e.g., in frame selection, media encoding and decoding, aspect ratios, etc.). Hence selective exclusion of fingerprints is difficult. To address this problem of selective exclusion, FIG. 5A presents a temporal stop-fingerprint classification method in which the stop-fingerprints calculation is influenced by the fingerprints within the same reference content that fall within a specified time duration only. In this stop-fingerprint method, every fingerprint is compared against all the fingerprints from the same video only if the timestamp of the fingerprints is within the specified time window of T. Thus, if the timestamps of the fingerprints to be compared are t1 and t2 and $|t1-t2| \leq T$ then and then only the two fingerprints would be compared and if the distance between these fingerprints is less than the threshold distance then they would be classified as neighbors. If $|t1-t2| > T$ then even if the distance between fingerprints is less than the threshold distance, they would not be categorized as neighbors. FIG. 500 is similar to the FIG. 400 with the only difference in step 504 compared to the step 404. In step 504, the timestamps of the fingerprints are taken into account and the fingerprints that meet the time window criteria are only considered for the stop-fingerprint classification purpose. As shown in FIG. 5B only three fingerprints out the given fingerprints depicted in FIG. 450 meet the time-window criteria. And the classification of the fingerprint 552 is done accordingly. If the classification rule is same as it was in the example of the individualized sop-fingerprint calculation then the fingerprint 452 is not classified as a stop-fingerprint. Thus using this method similar fingerprints that are more than T second apart would not be classified as stop-fingerprints.

Backward Looking Temporal Stop-Fingerprint Classification Method

Even though the temporal stop-fingerprint classification method is useful as described so far, further improvements can be made. For example, instead of classifying all of the repeated (similar) fingerprints as stop-fingerprints, one fingerprint could be classified as a non stop-fingerprint. For example, the first occurrence can be left as non-stop-fingerprint so that the repetitive content is not eliminated from the database completely. In another example, an alternative approach can be used in the temporal stop-fingerprint method regarding waiting for time window T to pass before analysis of stop-fingerprint can be completed on the any fingerprint. The temporal stop-fingerprint generation method can be modified to search for neighboring candidate fingerprints in the set of all fingerprints having timestamp less than the timestamp of the fingerprint in consideration, such as in a previous time window T. Thus if the timestamp of the fingerprint in consideration is t1 and the timestamp of the fingerprint for comparison is t2 where t2<t1, and $t1-t2<T$ then the two fingerprints would be termed as neighbors and compared only if the distance between these fingerprints is less than the threshold distance.

Reduced Size Reference Database Stop-Fingerprint Classification Method

The computing cost to analyze and classify one fingerprint in the centralized and distributed stop-fingerprint classification method depends on the number of fingerprints present in the reference database. As the database size grows, the cost of stop-fingerprint analysis increases proportionally. To reduce the computing overhead of stop-fingerprint analysis, the stop-fingerprint analysis can be performed on a smaller sized database.

FIG. 6 illustrates a reference database based stop-fingerprint process 600 in accordance with an embodiment of the present invention. In this process 600, instead of comparing every fingerprint against every other fingerprint in the reference database, every fingerprint is compared against every fingerprint in a smaller reference database specifically designed and maintained for the stop-fingerprint analysis. The smaller database can be derived by various methods. In a simplest method the smaller database can be constructed by taking fingerprints of few of the videos randomly from the complete reference database. In another method, depending on the type and metadata of the reference video for which fingerprint analysis is to be carried out, some videos from the set of all reference videos can be selected as a reference database for stop-fingerprint classification.

The reference database is generated for reference base stop-fingerprint classification in various ways. A simple method of splitting the reference database by the type or even randomly is sufficient.

Dictionary Based Stop-Fingerprint Classification

In text based search system, a list of stop words is pre-determined and is later used in the search algorithms. Leveraging these insights, but applied to an entirely new realm of media fingerprinting, a set of stop-fingerprints can be constructed and used as a reference stop-fingerprint database. At step 602, a signature set is built for single media. At step 604, the reference signature database is read for classification. At step 606, for each fingerprint to be classified, the fingerprint is then only compared with all the fingerprints in the stop-fingerprint reference database. At step 608, a determination is made whether the fingerprint to be classified is greater than a threshold. If the fingerprint to be classified is greater than the threshold, a yes determination, then it falls within some distance from any of the fingerprint in the stop-fingerprint database, considered a neighbor signature or neighboring signature, and is classified as a stop-fingerprint at step 610. Otherwise, a no determination is made and the fingerprint to be classified is determined to be not a stop-fingerprint at step 612. At step 614, a determination is made whether all signatures have been classified and if yes, the end step 616 is reached. Otherwise, the process 600 returns to step 606 and the process from that point repeats. The reference stop-fingerprint database can be constructed by various methods. It can be created by running any of the stop-fingerprint analysis algorithms discussed above on a pre-selected subsets of the full reference database. Then all the fingerprints that are classified as stop-fingerprints are included in the reference stop-fingerprints database. If necessary all these fingerprints can carry a weight factor representing their stop-fingerprints characteristics. By scoring the stop-fingerprints, for example based on the time stamp distance in the media file, the stop-fingerprints can be weighted and used for a more detailed, finer-grained search. For instance, upon determining that a query fingerprint is most-closely matched to a given non-stop-fingerprint, that query fingerprint could be compared with stop-fingerprints in the neighborhood (e.g., threshold time window) of the given non-stop-fingerprint to thereby select a specific most-closely matching one of the neighboring stop-fingerprints, and consequently determine with greater precision the position within the reference media (e.g., a time point) associated with the query fingerprint.

Modifcation of Stop-Fingerprint Generation Methods Based on Hashing

If the database is quite large, then the number of fingerprints and the computational complexity of classifying the fingerprints into stop-fingerprints and non-stop-fingerprints increases with the square law, i.e. the stop-fingerprint analysis is $O(n^2)$ in complexity. To reduce the computational complexity, an added criterion can be developed.

For example, for every fingerprint, a hashing function can be defined which generates a hash key for each fingerprint. Alternatively, a hash key can be generated by the FP system along with a fingerprint. For example, a descriptor is formed based on a plurality of characteristics, having a range between 0 and C>1, of a selected image blob or object. A threshold is either set according to prior empirical data or determined by the descriptor values and descriptor values greater than the threshold produce a '1' and less than or equal to the threshold produce a '0' generating signature, a binarized representation of the image blob or object. The goal of empirically setting the threshold is to generate unique signatures, which are more likely unique when the numbers of ones and zeros are approximately equal.

In order to facilitate fast search, a hash signature is generated from the primary signature and is shorter than the primary signature. For example, for a 64-dimensional descriptor, in addition to a 64-bit signature, an H-bit hash signature may be generated, where H<64. This hash signature may be based on combining the values of various dimensions, the characteristics, into a single combined value and then thresholding the combined values with a hash threshold. For example with H=16, the values of the dimensions in groups of four are combined by either taking the sum of the four values, the average of the four values, or the sum of the square of the four values. After thresholding, a 16 bit hash signature or key is generated.

A traversal hash signature may be augmented with additional bits that relate to an underlying feature, a stop-fingerprint assessment. Alternatively, a locality sensitive hashing (LSH) type scheme can also be used for near neighbor searches. When comparing fingerprint for stop-fingerprint analysis, the comparison can be limited only to the fingerprints that have the same hash key. This can reduce the set of fingerprints for comparison by large fraction. If the hash key size is of 16 bits and hash key are uniformly distributed, the number of comparisons would decrease by $2^{16}$. Hashing mechanism can be applied to all the previous algorithms. However the rules and thresholds for stop-fingerprint analysis should be changed accordingly by carrying out further experiments to choose the rules and thresholds.

FIG. 7 presents an algorithm for generating stop-fingerprints based on hashing. The algorithm is similar to the algorithm describe in FIG. 2 B with the added step of 705 and a modified step of 706. The step 705 calculates the hash key for the fingerprint for which the stop-fingerprint decision is to be made. The step 706 restricts the set of fingerprints used for comparison to the set of fingerprints having the same hash key.

Stop-Fingerprint Definition Revisited

In a modified example, where a stop fingerprint can be defined by a relationship between neighbors in the complete multimedia database and in a temporal window of the multimedia database, the stop-fingerprint classification rule may include various parameters outlined above. For example, the parameters may include neighbors in an overall reference database, neighbors within the self-content within the same reference file, neighbors within the self-content with specified time duration, neighbors within the self-content only in past, and neighbors with hash-key matching. Combinations of all these parameters could be used for stop-fingerprint classification methods.

The stop-fingerprint classification rule can be deterministic or probabilistic. The stop-fingerprint classification rule might define a probability function of neighborhood statistics. For example the probability function may look like $$P_S = 1 - 1/(\#neigh_0 + neigh_1 + neigh_2 + neigh_3)$$

Then for every fingerprint, after calculating the neighborhood statistics, the $P_S$ value is calculated. And a comparison is made with a probability of $P_S$ that a fingerprint is classified as a stop-fingerprint.

The stop-fingerprint rule may also be defined so as to exclude a determined fraction of the number of fingerprints, such as 10% of the total fingerprints should be excluded. This type of approach has been determined to function better in a mostly static database and other approaches are generally used where the database content is dynamically changing. In this case, the fingerprints may be ranked as per the neighbor statistics and then a fixed fraction of them in some order can be selected as stop-fingerprints.

If hash based methods are used for stop-fingerprints, then if some hash buckets contain fingerprints more than a predefined threshold, then the entire bucket of fingerprints can be classified as a stop-fingerprint bucket and all fingerprints in that bucket can be classified as stop-fingerprints. The threshold on the bucket size can be a fixed number of fingerprints or it can be a number proportional to the database size such as a fraction of the overall number of fingerprints in the database.

Use of Stop-Fingerprint Classification

Once the fingerprints are classified as into stop-fingerprints and non-stop-fingerprints classes, the classification information can be used for various purposes. Various intermediate parameters used for classification can also be used in various other ways. The intermediate parameters are scores for different bit error calculations done during classification. So besides classifying for stop v/s non-stop, scores can also be used as weights during the matching function. Specifically, all the information used in the classification of stop-fingerprints can be used to remove the fingerprints from the reference and query fingerprints; or the classification information can be used to modify the reference and query fingerprints and fingerprint set by adding the intermediate parameters; or it can be used in the search algorithms to modify the scoring methods; or it can be used to give differential treatment to different fingerprints; or it can be used to treat the fingerprint differently at cluster and correlation states of the search system. By adding the scoring mechanism, the scoring can be used to identify silence, provide weighting factor depending on some criterion such as the distance within which the stop-word signatures are repeated and the like.

A set of signatures belonging to a traversal hash signature is called a cluster. In signature correlation, a set of query signatures is compared against a set of reference signatures for a database clip. For example, a score is derived for each query signature based on a distance measure to the closest signatures in a selected reference signature database, and the number of matches is recorded. A distance measure may be a Hamming bit distance. These scores are combined, for example, the scores are averaged, for the entire set of query signatures to give an overall score for the database clip. The signature correlation procedure is repeated for multiple clips which may be categorized as top candidates for evaluation, since there may be more than one clip, if similar content is repeated in the reference database.

As an example of the use of stop-fingerprint classification, consider following scenario. Suppose the fingerprinting algorithm generates a fingerprint whenever it encounters silence in the reference audio. However, silence being very common, such fingerprints cannot be used for searching effectively. Thus removing the silence fingerprint from the similarity search stage would speed the similarity search stage. However, the silence fingerprint can be used to verify a matching sequence because the matching sequence would have the silence fingerprint. Thus, in the sequence correlation stage the complete set of fingerprints, including stop and non-stop and silence fingerprints, are used to correlate the timing between the reference and query fingerprints. The complete set of fingerprints (stop and non-stop) are used during the sequence correlation stage to correlate the timing between the reference and query fingerprints. In a false positive test, the silence fingerprint at corresponding places in the query and reference sequence can be checked to determine whether the result is a true false positive or actually should be a positive result. Thus, the stop-fingerprint definition is also dependent on the type of use and in the search system, different stages can use different definitions of stop-fingerprints. Different search stages also use the stop-fingerprint information for different purposes. Stop-fingerprint thus can help to improve the speed, improve the True Positive Rate, and reduce the False Positive Rate, as noted above, and to detect the multiple matches. As stop fingerprints helps in reducing the false positive rates, some of the parameters and thresholds can be loosened to improve the true positive rates. Also, removing repetitive content, including the silent content, helps in reducing the number of potential candidates during the candidate selection phase. The above example also applies to video fingerprinting techniques in which video fingerprints are generated from blank frames (or other insufficiently unique frames, such as color test bars, etc.). Classifying video fingerprints generated from such frames as stop-fingerprints affords benefits to multiple stages of the search process.

Stop-Fingerprint Generation at the Fingerprinting Stage

Some of the steps of stop-fingerprint analysis can also be carried out at the FP stage. For example the individualized, temporal method, backward looking temporal methods of stop-fingerprint classification can be implemented at the fingerprint system because the classification method does not depend on the fingerprints from the other multimedia content. It is also easier and efficient to implement some methods of stop-fingerprint generation at the fingerprint stage. In this case, the stop-fingerprint operation is done on the portable smart device 110 side at the time of fingerprint generation (or the media presentation device 104, or both) thus reducing the load on the server 108. In this case, either the file-based or temporal modes are supported.

It is noted that stop-fingerprint analysis and classification applies to the fingerprint stage which includes descriptor generation, descriptor thresholding to produce signatures, and operating on signatures, such as thresholding, to produce hash signatures. For example, a selected characteristic or dimension comprising a descriptor may be isolated for different thresholding that enhances the analysis and classification of stop-fingerprints.

FIG. 8 illustrates a schematic of the stop-fingerprint analysis 800 applied at the fingerprinting stage. The raw fingerprint generation block 802 takes the multimedia as input and generates serially fingerprints 803 that are stored 806 by the temporary storage block 805. If the stop-fingerprint algorithm 809 used is temporal then the storage block 805 stores only some fingerprints needed for the temporal time window and not all the fingerprints. This is a real-time scenario, and there is no need to store the other fingerprints during the stop-word computation. The stop-fingerprint analysis block 809 applied the selected stop-fingerprint algorithm to the fingerprints 806 and generates the processed fingerprints 810.

Figure 9:
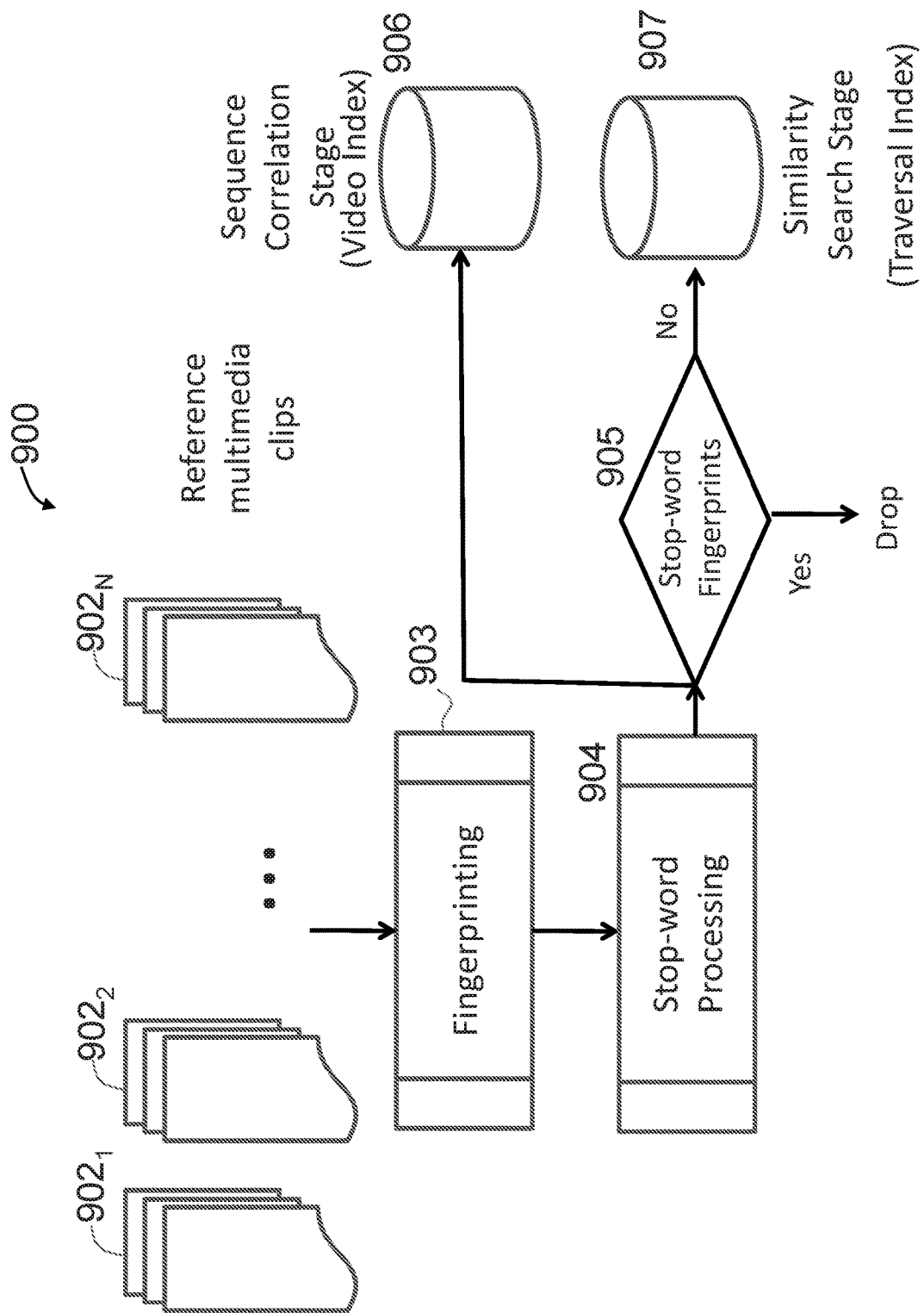
FIG. 9 illustrates a search system 900 that makes use of the stop-fingerprint analysis described herein in accordance with an embodiment of the present invention.

FIG. 9 illustrates a search system 900 that makes use of the stop-fingerprint analysis described herein in accordance with an embodiment of the present invention. The stop-fingerprints can be identified after the fingerprinting process on the client or the server. The stop-fingerprints are not added to the similarity search stage since they are dropped but utilized in the correlation stage. Within the correlation stage, depending on the desired behavior as described herein, the stop fingerprints are used or not used. The fingerprints after stop-word processing are stored in the correlation stage. Additional status fields indicating presence of stop-word fingerprints, and possibly score information is passed along with the fingerprints to that stage. In most cases, the stop-words are used in the correlation stage, especially for audio, to preserve the continuity of fingerprints in a sequence for sequence correlation.

In FIG. 9, reference multimedia clips $902_1$, $902_2$, ... $902_N$ that are relevant to the application at hand are identified. The clips $902_1$, $2902_2$, ... $902_N$ refer to distinct pieces of multimedia content. For example, the clips could be from a movie and represent different temporal portions of the movie, including audio and video content, or they could be from different movies. The clips could also be from a live audio and video recording, such as a karaoke event in a tavern captured on a smartphone under dim lights and with a great deal of interfering multi speaker sources. Different pieces of multimedia content may be fingerprinted independently, leading to a parallelizable system. A clip of multimedia content can be broken down into its temporal components, such as frames in the case of video, or temporal audio segments in case of audio. Even more parallelism is possible by independently fingerprinting at the temporal component level, or frame level.

A user requests identification of the content of the karaoke multimedia clip, such as identification of a song and logos that may be captured, by forming a multimedia query. A portion of the karaoke clip is processed at fingerprinting step 903 to generate query signatures, hash data, and associated metadata, known collectively as a query fingerprint representing the karaoke multimedia clip. Stop-fingerprint processing at step 904 follows which identifies the stop-fingerprints as described above. The karaoke multimedia clip fingerprints and associated stop-fingerprints are transferred to step 906 for sequence correlation processing. At decision step 905, stop fingerprints are excluded, such as dropping the detected duplicate stop-fingerprints from the media stream, for use in the similarity search step 907. In the search system 900, stop-fingerprints are used to improve the processing speed, improve the True Positive Rate, and reduce the False Positive Rate, as noted above, and to detect multiple matches. As stop fingerprints helps in reducing the false positive rates, some of the parameters and thresholds can be loosened to improve the true positive rates. Also, removing repetitive content, including the silent content, helps in reducing the number of potential candidates during the candidate selection phase of the search process 900.

Those of skill in the art will appreciate that based on the present disclosure additional alternative systems and methods for multi-media content identification using multi-level content signature correlation and fast similarity search may be determined in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims.

The invention claimed is:

1. A non-transitory machine-readable medium having instructions embodied thereon, which, when executed by one or more processors of a machine, cause the machine to perform operations comprising:
    establishing a stop-fingerprint rule for a multimedia fingerprint neighborhood analysis; and
    classifying a plurality of multimedia fingerprints into unique fingerprints and non-unique fingerprints by applying the stop-fingerprint rule to each reference fingerprint selected from a plurality of reference fingerprints stored in a reference multimedia fingerprint database,
    wherein applying the stop-fingerprint rule to each reference fingerprint in the reference multimedia fingerprint database comprises, for each reference fingerprint:
        determining, for each other reference fingerprint in the reference multimedia fingerprint database, a respective fingerprint distance between the reference fingerprint and the other reference fingerprint,
        determining, for the reference fingerprint, a set of neighboring fingerprints within the reference multimedia fingerprint database, wherein the set of neighboring fingerprints comprises the other reference fingerprints within the reference multimedia fingerprint database for which the determined respective fingerprint distance is less than a first threshold value,
        determining a quantity of reference fingerprints in the set of neighboring fingerprints,
        performing a comparison of the determined quantity of reference fingerprints in the set of neighboring fingerprints to a second threshold value,
        if the quantity of reference fingerprints in the set of neighboring fingerprints is less than the second threshold value, then classifying the reference fingerprint as one of the unique fingerprints, and
        if the quantity of stop fingerprints in the set of neighboring fingerprints is greater than the second threshold value, then classifying the reference fingerprint as one of the non-unique fingerprints,
    wherein applying the stop-fingerprint rule to a given reference fingerprint in the reference multimedia fingerprint database is distributed, with a processor of multiple processors requesting from each other processor of the multiple processors a respective quantity of neighboring reference fingerprints of the reference fingerprint, wherein each processor of the multiple processors has access to the first threshold value for use by the processor to determine whether reference fingerprints are neighboring.

2. The non-transitory machine-readable medium of claim 1, wherein the non-unique fingerprints are classified as stop-fingerprints and the unique fingerprints are classified as non-stop-fingerprints.

3. The non-transitory machine-readable medium of claim 1, wherein the operations further comprise receiving the plurality of multimedia fingerprints from a single reference media file.

4. The non-transitory machine-readable medium of claim 1, wherein each fingerprint distance is a Hamming distance.

5. The non-transitory machine-readable medium of claim 4, wherein each fingerprint distance is a distance weighted neighborhood score of a fingerprint to be evaluated based on a number of neighbor fingerprints where the Hamming distance is N.

6. A non-transitory machine-readable medium having instructions embodied thereon, which, when executed by one or more processors of a machine, cause the machine to perform operations comprising:
    selecting a plurality of fingerprints that meet a time window criteria, wherein selecting the plurality of fingerprints comprises, for each fingerprint, determining that a respective timestamp of the fingerprint is within the time window of the time window criteria;
    measuring a fingerprint distance from each fingerprint that meets the time window criteria to a plurality of reference fingerprints in a reference fingerprint database; and
    classifying, as a non-unique stop-fingerprint and based on the respective fingerprint distances, each fingerprint that (i) meets the time window criteria and (ii) has at least a selected quantity of the plurality of reference fingerprints within a threshold distance, wherein classifying each fingerprint that meets the time window criteria comprises, for each fingerprint that meets the time window criteria:
  determining, for the fingerprint, a set of neighboring fingerprints, wherein the set of neighboring fingerprints comprises the fingerprints for which the fingerprint distance is less than a first threshold value,
  determining a quantity of fingerprints in the set of neighboring fingerprints,
  performing a comparison of the quantity of fingerprints in the set of neighboring fingerprints to a second threshold value,
  if the quantity of fingerprints in the set of neighboring fingerprints is less than the second threshold value, then classifying the fingerprint as a unique non-stop fingerprint, and
  if the quantity of fingerprints in the set of neighboring fingerprints is greater than the second threshold value, then classifying the fingerprint as the non-unique stop-fingerprint,
  wherein classifying the fingerprint that meets the time window criteria is distributed, with a processor of multiple processors requesting from each other processor of the multiple processors a respective quantity of neighboring fingerprints of the fingerprint, wherein each processor of the multiple processors has access to the first threshold value for use by the processor to determine whether reference fingerprints are neighboring.

7. The non-transitory machine-readable medium of claim 6, wherein classifying is performed using a common set of the plurality of reference fingerprints that fall within the time window of the time window criteria.

8. The non-transitory machine-readable medium of claim 7, wherein the common set of the plurality of reference fingerprints relate to a particular reference multimedia content.

9. The non-transitory machine-readable medium of claim 6, wherein the operations further comprise determining that the respective timestamps of two of the plurality of fingerprints are within the time window,
  wherein classifying comprises, responsive to determining that the respective timestamps of the two of the plurality of fingerprints are within the time window, comparing the two of the plurality of fingerprints.

10. The non-transitory machine-readable medium of claim 9, wherein the operations further comprise: responsive to (i) a difference in the respective timestamps of the two of the plurality of fingerprints being less than the time window and (ii) the distance between the two of the plurality of fingerprints being less than a threshold distance, then classifying the two of the plurality of fingerprints as neighbors.

11. The non-transitory machine-readable medium of claim 9, wherein the two of the plurality of fingerprints comprise a first fingerprint and a second fingerprint, wherein a first timestamp of the first fingerprint is t1,
  wherein a second timestamp of the second fingerprint is t2, and
  wherein the operations further comprise:
    responsive to t2<t1, and |t1−t2|<T, then classifying the first fingerprint and the second fingerprint as neighbors, and
    responsive to a distance between the first fingerprint and the second fingerprint being less than the threshold distance, comparing the first fingerprint and the second fingerprint.

12. A system comprising:
a memory that stores instructions; and
one or more processors configured by the instructions to perform operations comprising:
  generating a plurality of fingerprints and associated hash keys;
  measuring a fingerprint distance from each fingerprint to reference fingerprints (i) in a reference fingerprint database and (ii) having a hash key that is the same as the associated hash key of the fingerprint; and
  classifying each fingerprint that has a selected number of the reference fingerprints within a threshold distance as a non-unique stop-fingerprint, wherein classifying each fingerprint having the hash key comprises, for each fingerprint having the hash key:
    (i) determining, for the fingerprint, a set of neighboring fingerprints, wherein the set of neighboring fingerprints comprises the fingerprints for which the fingerprint distance is less than a first threshold value,
    (ii) determining a quantity of fingerprints in the set of neighboring fingerprints,
    (iii) performing a comparison of the quantity of fingerprints in the set of neighboring fingerprints to a second threshold value,
    (iv) if the quantity of fingerprints in the set of neighboring fingerprints is less than the second threshold value, then classifying the fingerprint as a unique non-stop fingerprint, and
    (v) if the quantity of fingerprints in the set of neighboring fingerprints is greater than the second threshold value, then classifying the fingerprint as the non-unique stop-fingerprint.

13. The system of claim 12, wherein the operations configured by the instructions to be performed by the one or more processors further comprises generating, for each fingerprint, the associated hash key for the fingerprint.

14. The system of claim 12, wherein, for each fingerprint, the hash key associated with the fingerprint includes a quantity of bits that is less than a quantity of bits of the fingerprint.

15. The system of claim 12, wherein the reference fingerprints are split across a plurality of processors, each processor having a part of the reference fingerprint database.

* * * * *